(12) United States Patent
Nakada et al.

(10) Patent No.: US 10,221,745 B2
(45) Date of Patent: Mar. 5, 2019

(54) EXHAUST PURIFICATION SYSTEM AND CATALYST CONTROL METHOD

(71) Applicant: ISUZU MOTORS LIMITED, Shinagawa-ku, Tokyo (JP)

(72) Inventors: Teruo Nakada, Yokohama (JP); Takayuki Sakamoto, Fujisawa (JP); Daiji Nagaoka, Kamakura (JP); Hiroyuki Yuza, Yokohama (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/560,963

(22) PCT Filed: Feb. 29, 2016

(86) PCT No.: PCT/JP2016/056021
§ 371 (c)(1),
(2) Date: Sep. 22, 2017

(87) PCT Pub. No.: WO2016/152391
PCT Pub. Date: Sep. 29, 2016

(65) Prior Publication Data
US 2018/0051615 A1  Feb. 22, 2018

(30) Foreign Application Priority Data

Mar. 25, 2015 (JP) ................. 2015-062508

(51) Int. Cl.
| | |
|---|---|
| *F01N 3/00* | (2006.01) |
| *F01N 9/00* | (2006.01) |
| *F01N 3/20* | (2006.01) |
| *F01N 3/36* | (2006.01) |
| *F02D 45/00* | (2006.01) |
| *F01N 3/08* | (2006.01) |

(52) U.S. Cl.
CPC ........... *F01N 9/005* (2013.01); *F01N 3/0814* (2013.01); *F01N 3/0842* (2013.01);
(Continued)

(58) Field of Classification Search
USPC ......... 60/274, 276, 277, 286, 295, 297, 301, 60/303
See application file for complete search history.

(56) References Cited

U.S. PATENT DOCUMENTS

| | | | |
|---|---|---|---|
| 6,523,340 B1 * | 2/2003 | Kurihara | F01N 11/005 374/144 |
| 7,073,321 B2 * | 7/2006 | Katayama | F01N 11/00 60/274 |

(Continued)

FOREIGN PATENT DOCUMENTS

| | | |
|---|---|---|
| JP | 2005188476 A | 7/2005 |
| JP | 2008202425 A | 9/2008 |

(Continued)

OTHER PUBLICATIONS

International Search Report and Written Opinion for related PCT application No. PCT/JP2016/056021 dated Apr. 12, 2016.

(Continued)

*Primary Examiner* — Binh Q Tran
(74) *Attorney, Agent, or Firm* — Procopio, Cory, Hargreaves & Savitch LLP

(57) ABSTRACT

An exhaust purification system includes; a catalyst provided in an exhaust passage of an engine to purify an exhaust gas; a catalyst temperature estimating unit that estimates a temperature of the catalyst based on an initial temperature of the catalyst at the time of starting of the engine and a caloric value of the catalyst which changes depending on an operating state of the internal combustion engine; and an initial catalyst temperature setting unit that sets an initial temperature of the catalyst based on a catalyst temperature stored immediately before stopping the engine, a temperature of an exhaust gas flowing into the catalyst which is stored immediately before stopping the engine, a temperature of an exhaust gas flowing into the catalyst which is acquired at the (Continued)

time of starting the engine, and a temperature of air taken into the engine which is acquired at the time of starting the engine.

2 Claims, 14 Drawing Sheets

(52) U.S. Cl.
CPC .............. *F01N 3/0885* (2013.01); *F01N 3/20* (2013.01); *F01N 3/36* (2013.01); *F01N 9/002* (2013.01); *F02D 45/00* (2013.01); *F01N 2560/06* (2013.01); *F01N 2560/14* (2013.01); *F01N 2570/14* (2013.01); *F01N 2900/1404* (2013.01); *F01N 2900/1602* (2013.01); *F01N 2900/1631* (2013.01)

(56) References Cited

U.S. PATENT DOCUMENTS

| | | | | |
|---|---|---|---|---|
| 8,033,098 | B2 * | 10/2011 | Tateno | F02D 31/002 123/90.11 |
| 9,500,110 | B2 * | 11/2016 | Ota | F01N 3/106 |
| 2006/0142932 | A1 * | 6/2006 | Yasui | F01L 1/352 701/114 |
| 2008/0156075 | A1 | 7/2008 | Cunningham | |
| 2009/0049824 | A1 | 2/2009 | Kojima et al. | |
| 2011/0270568 | A1 | 11/2011 | Hirai et al. | |

FOREIGN PATENT DOCUMENTS

| | | |
|---|---|---|
| JP | 2009047086 A | 3/2009 |
| JP | 2010185433 A | 8/2010 |
| JP | 2010265786 A | 11/2010 |
| JP | 2011094572 A | 5/2011 |
| JP | 2011231709 A | 11/2011 |
| WO | 2010013365 A1 | 2/2010 |
| WO | 2011055176 A1 | 5/2011 |

OTHER PUBLICATIONS

Extended European Search Report for related EP App No. 16768294.7 dated Jul. 30, 2018, 6 pgs.

* cited by examiner

EXHAUST PURIFICATION SYSTEM AND CATALYST CONTROL METHOD

CROSS-REFERENCE TO RELATED APPLICATIONS

This application is a U.S. National Stage entry of PCT Application No. PCT/JP2016/056021, filed on Feb. 29, 2016, which claims priority to Japanese Patent Application No. 2015-062508, filed Mar. 25, 2015, the contents of which are incorporated herein by reference.

TECHNICAL FIELD

The present invention relates to an exhaust purification system and a catalyst control method.

BACKGROUND ART

In the related art, an NOx occlusion reduction type catalyst is known as a catalyst which reduces and purifies a nitrogen compound (NOx) in an exhaust gas discharged from an internal combustion engine. When the exhaust gas is under a lean atmosphere, the NOx occlusion reduction type catalyst occludes the NOx contained in the exhaust gas. When the exhaust gas is under a rich atmosphere, the NOx occlusion reduction type catalyst detoxifies the occluded NOx through reducing and purifying by hydrocarbon contained in the exhaust gas, and discharges the NOx. For this reason, in a case where the NOx occlusion amount of the catalyst reaches a predetermined amount, in order to recover NOx occlusion capacity, it is necessary to regularly perform a so-called NOx purge which makes the exhaust gas be in a rich state by a post injection or an exhaust pipe injection (for example, see Patent Literature 1).

In the NOx occlusion reduction type catalyst, a sulfur oxide contained in the exhaust gas (hereinafter, referred to as SOx) is also occluded. When the SOx occlusion amount increases, the NOx purification capacity of the NOx occlusion reduction type catalyst is reduced, which is problematic. For this reason, in a case where an SOx occlusion amount reaches a predetermined amount, in order that the SOx is desorbed from the NOx occlusion reduction type catalyst to recover the NOx occlusion reduction type catalyst from S-poisoning, it is necessary to regularly perform the so-called SOx purge in which an unburned fuel is supplied to an upstream-side oxidation catalyst by the post injection or the exhaust pipe injection to raise an exhaust temperature to an SOx desorption temperature (for example, see Patent Literature 2).

CITATION LIST

Patent Literature

[Patent Literature 1] JP-A-2008-202425
[Patent Literature 2] JP-A-2009-047086

SUMMARY OF THE INVENTION

Technical Problem

Generally, in such a type of device, an exhaust pipe injection amount or a post injection amount is feedback-controlled based on a deviation between a target temperature and a catalyst temperature when a catalyst regeneration process such as SOx purging is performed. Therefore, if the estimation accuracy of the catalyst temperature cannot be secured, the controllability of exhaust pipe injection and post injection deteriorates, causing problems such as an excessive temperature rise of the catalyst and deterioration of fuel consumption.

Particularly, in a state where an estimated initial temperature at the time of starting the internal combustion engine deviates from an actual temperature, there arises a problem that it takes time until the error between the actual catalyst temperature and the estimated temperature becomes sufficiently small. In order to reduce the error between the actual catalyst temperature and the estimated temperature at an early stage, it is necessary to appropriately set an estimated initial temperature at the time of starting.

An exhaust purification system and a catalyst control method according to this disclosure aim to reduce the error between the actual catalyst temperature and the estimated temperature at an early stage.

Solution to Problem

An exhaust purification system according to this disclosure includes: a catalyst that is provided in an exhaust passage of an internal combustion engine to purify an exhaust gas; a catalyst temperature estimating unit that estimates a temperature of the catalyst based on an initial temperature of the catalyst at the time of starting of the internal combustion engine and a caloric value of the catalyst which changes depending on an operating state of the internal combustion engine; a pre-stop catalyst temperature storing unit that stores the temperature of the catalyst estimated by the catalyst temperature estimating unit immediately before stopping the internal combustion engine, as a pre-stop catalyst temperature; a first exhaust temperature storing unit that stores a temperature of an exhaust gas flowing into the catalyst immediately before stopping the internal combustion engine, as a first exhaust temperature; a second exhaust temperature acquiring unit that acquires a temperature of an exhaust gas flowing into the catalyst at the time of starting the internal combustion engine, as a second exhaust temperature; an intake air temperature acquiring unit that acquires a temperature of air taken into the internal combustion engine at the time of starting the internal combustion engine, as an intake air temperature; and an initial catalyst temperature setting unit that sets an initial temperature of the catalyst based on the pre-stop catalyst temperature, the first exhaust temperature, the second exhaust temperature, and the intake air temperature.

An exhaust purification system according to this disclosure includes: an NOx occlusion reduction type catalyst that is disposed in an exhaust passage of an internal combustion engine to occlude and reduce a nitrogen compound contained in an exhaust gas discharged from the internal combustion engine; and a control unit that controls an air-fuel ratio of the exhaust gas discharged from the internal combustion engine, wherein the control unit operates to execute the following processes:

a catalyst temperature estimating process of estimating a temperature of the NOx occlusion reduction type catalyst based on an initial temperature of the NOx occlusion reduction type catalyst at the time of starting of the internal combustion engine and a caloric value of the NOx occlusion reduction type catalyst which changes depending on an operating state of the internal combustion engine;

a pre-stop catalyst temperature storing process of storing the temperature estimated by the catalyst temperature estimating process when the internal combustion engine transitions from the operating state to a stop state, as a pre-stop catalyst temperature;

a first exhaust temperature storing process of storing a temperature of an exhaust gas flowing into the catalyst when the internal combustion engine transitions from the operating state to the stop state, as a first exhaust temperature;

a second exhaust temperature acquiring process of acquiring a temperature of an exhaust gas flowing into the NOx occlusion reduction type catalyst at the time of starting the internal combustion engine, as a second exhaust temperature;

an intake air temperature acquiring process of acquiring a temperature of air taken into the internal combustion engine at the time of starting the internal combustion engine, as an intake air temperature; and an initial catalyst temperature setting process of setting an initial temperature of the NOx occlusion reduction type catalyst based on the pre-stop catalyst temperature, the first exhaust temperature, the second exhaust temperature, and the intake air temperature.

In an exhaust purification system including an NOx occlusion reduction type catalyst that is disposed in an exhaust passage of an internal combustion engine to occlude and reduce a nitrogen compound contained in an exhaust gas discharged from the internal combustion engine, a catalyst control method according to this disclosure includes: a catalyst temperature estimating process of estimating a temperature of the NOx occlusion reduction type catalyst based on an initial temperature of the NOx occlusion reduction type catalyst at the time of starting of the internal combustion engine and a caloric value of the NOx occlusion reduction type catalyst which changes depending on an operating state of the internal combustion engine; a pre-stop catalyst temperature storing process of storing the temperature estimated by the catalyst temperature estimating process when the internal combustion engine transitions from the operating state to a stop state, as a pre-stop catalyst temperature; a first exhaust temperature storing process of storing a temperature of an exhaust gas flowing into the catalyst when the internal combustion engine transitions from the operating state to the stop state, as a first exhaust temperature; a second exhaust temperature acquiring process of acquiring a temperature of an exhaust gas flowing into the NOx occlusion reduction type catalyst at the time of starting the internal combustion engine, as a second exhaust temperature; an intake air temperature acquiring process of acquiring a temperature of air taken into the internal combustion engine at the time of starting the internal combustion engine, as an intake air temperature; and an initial catalyst temperature setting process of setting an initial temperature of the NOx occlusion reduction type catalyst based on the pre-stop catalyst temperature, the first exhaust temperature, the second exhaust temperature, and the intake air temperature.

Advantages of the Invention

According to the exhaust purification system and the catalyst control method of this disclosure, it is possible to quickly reduce the error between the actual catalyst temperature and the estimated temperature after the internal combustion engine is started.

DESCRIPTION OF EMBODIMENTS

Hereinafter, an exhaust purification system according to one embodiment of the present invention will be described with reference to the accompanying drawings.

Figure 1:
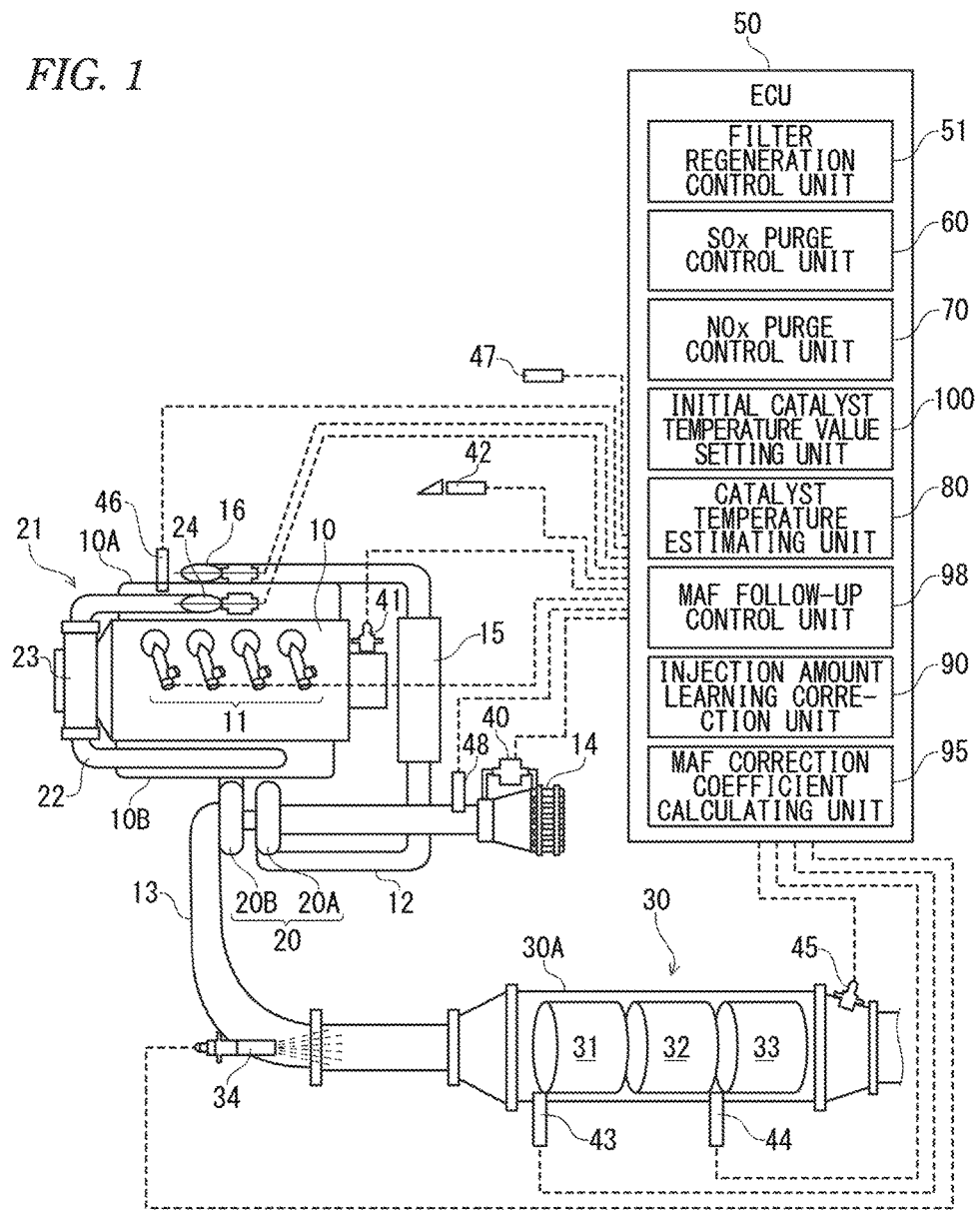
FIG. 1 is an entire configuration diagram illustrating an exhaust purification system according to this embodiment.

As illustrated in FIG. 1, an injector 11 which directly injects high pressure fuel accumulated in a common rail (not illustrated) into a cylinder is provided in each of cylinders of a diesel engine (hereinafter, simply referred to as an engine) 10. The fuel injection amount or the fuel injection timing of the in-cylinder injector 11 is controlled in response to an instruction signal input from an electronic control unit (hereinafter, referred to as ECU) 50.

An intake manifold 10A of the engine 10 is connected with an intake passage 12 which introduces fresh air therein, and an exhaust manifold 10B is connected with an exhaust passage 13 which derives an exhaust gas outside. An air cleaner 14, an intake air amount sensor (hereinafter, referred to as an MAF sensor) 40, an intake air temperature sensor 48 (an example of an intake air temperature acquiring unit of this disclosure), a compressor 20A of a variable capacity supercharger 20, an intercooler 15, an intake throttle valve 16, and the like are provided in order from an intake upstream side in the intake passage 12. A turbine 20B of the variable capacity supercharger 20, an exhaust post-treatment device 30, and the like are provided in order from an exhaust upstream side in the exhaust passage 13. The engine 10 is attached with an engine speed sensor 41, an accelerator opening sensor 42, a boost pressure sensor 46, and an outside air sensor 47.

In the description of this embodiment, an MAF sensor 40 for measuring and detecting the mass air flow is used as the intake air amount sensor for measuring and detecting the intake air amount (suction air flow) of the engine, but a different type of air flow sensor from the MAF sensor 40 or a unit substituted for the air flow sensor may be used as long as it can measure and detect the suction air flow of the engine.

An EGR (Exhaust Gas Recirculation) device 21 includes an EGR passage 22 which connects the exhaust manifold 10B and the intake manifold 10A, an EGR cooler 23 which cools an EGR gas, and an EGR valve 24 which adjusts an EGR amount.

The exhaust post-treatment device 30 is configured such that an oxidation catalyst 31, an NOx occlusion reduction type catalyst 32, and a particulate filter (hereinafter, simply referred to as a filter) 33 are disposed in order from the exhaust upstream side in a case 30A. An exhaust injector 34 which injects an unburned fuel (mainly, hydrocarbon (HC)) into the exhaust passage 13 in response to the instruction signal input from an ECU 50 is provided in the exhaust passage 13 on the upstream side from the oxidation catalyst 31.

For example, the oxidation catalyst 31 is formed by carrying an oxidation catalyst component on a ceramic carrier surface such as a honeycomb structure. When an unburned fuel is supplied by the post injection of the exhaust injector 34 or the in-cylinder injector 11, the oxidation catalyst 31 oxidizes the unburned fuel to raise the exhaust temperature.

For example, the NOx occlusion reduction type catalyst 32 is formed by carrying an alkali metal and the like on a ceramic carrier surface such as a honeycomb structure. The NOx occlusion reduction type catalyst 32 occludes NOx in the exhaust gas when an exhaust air fuel ratio is in a lean state, and reduces and purifies the occluded NOx by a reducing agent (HC and the like) contained in the exhaust gas when the exhaust air fuel ratio is in a rich state.

For example, the filter 33 is formed such that a plurality of cells sectioned by porous partition walls are disposed in a flowing direction of the exhaust gas, and the upstream side and the downstream side of the cells are sealed alternately. In the filter 33, PM in the exhaust gas is collected in a pore or a surface of the partition wall, and when the estimation amount of PM deposition reaches a predetermined amount, the so-called filter-forced regeneration is performed which combusts and removes the PM. The filter-forced regeneration is performed in such a manner that the unburned fuel is supplied to the oxidation catalyst 31 on the upstream side by an exhaust pipe injection or the post injection, and the temperature of the exhaust gas flowing in the filter 33 is raised to a PM combusting temperature.

A first exhaust temperature sensor 43 is a second exhaust temperature acquiring unit of this disclosure and is provided on the upstream side from the oxidation catalyst 31, and detects the temperature of the exhaust gas flowing in the oxidation catalyst 31. A second exhaust temperature sensor 44 is provided between the NOx occlusion reduction type catalyst 32 and the filter 33, and detects the temperature of the exhaust gas flowing in the filter 33. An NOx/lambda sensor 45 is provided on the downstream side from the filter 33, and detects an NOx value and a lambda value of the exhaust gas passing through the NOx occlusion reduction type catalyst 32 (hereinafter, referred to as an excess air ratio).

The ECU 50 performs various controls on the engine 10 and the like, and includes a well-known CPU or a ROM, a RAM, an input port, an output port, and the like. In order to perform the various controls, the sensor values of the sensors 40 to 48 are input to the ECU 50. The ECU 50 includes a filter regeneration control unit 51, an SOx purge control unit 60, an NOx purge control unit 70, initial catalyst temperature value setting unit 100, a catalyst temperature estimating unit 80, a MAF follow-up control unit 98, an injection amount learning correction unit 90, and a MAF correction coefficient calculating unit 95 as partial functional elements. In description, such functional elements are included in the ECU 50 which is an integral hardware. However, any part thereof may be provided in a separate hardware.

[Filter Regeneration Control]

Figure 2:
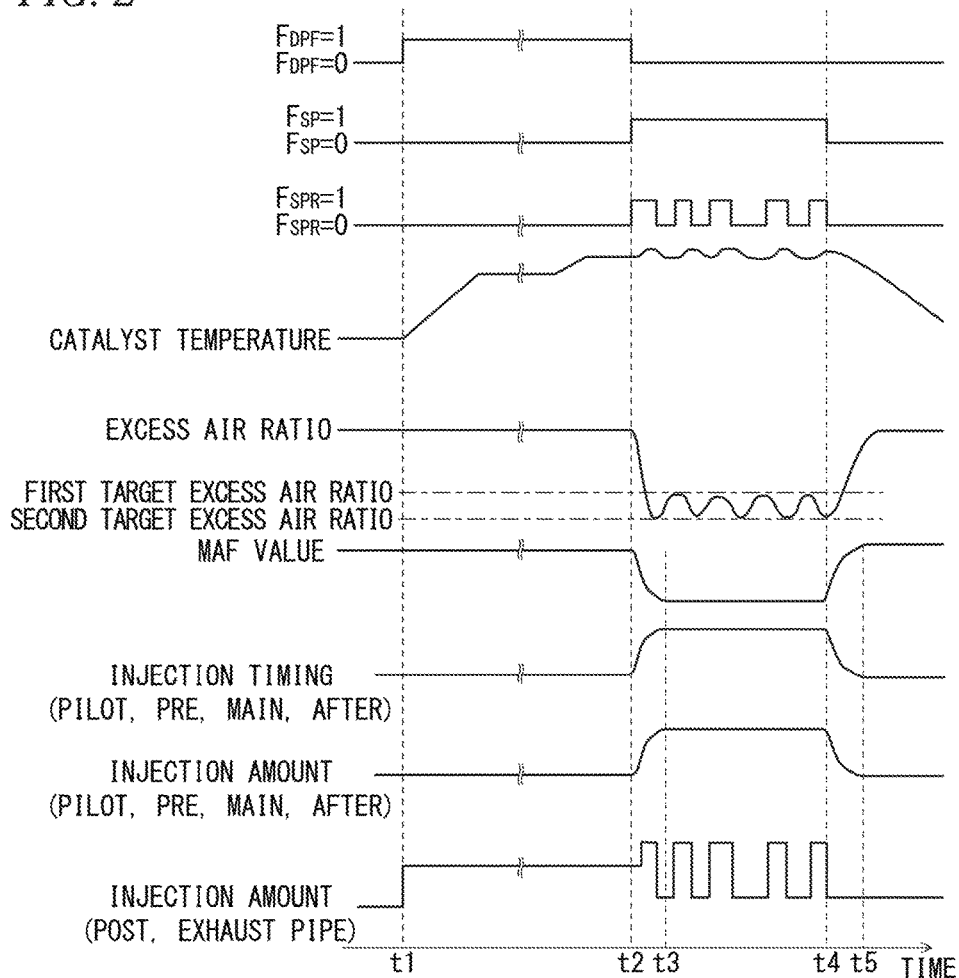
FIG. 2 is a timing chart for describing an SOx purge control according to this embodiment.

The filter regeneration control unit 51 estimates the PM deposition amount of the filter 33 from the travel distance of the vehicle, or the differential pressure across the filter detected by a differential pressure sensor (not illustrated), and turns on a forced regeneration flag $F_{DPF}$ when the estimation amount of PM deposition exceeds a predetermined upper limit threshold (see time $t_1$ of FIG. 2). When the forced regeneration flag $F_{DPF}$ is turned on, the instruction signal which executes the exhaust pipe injection is transmitted to the exhaust injector 34, or the instruction signal which executes the post injection is transmitted to each of the injectors 11, so that the exhaust temperature is raised to the PM combusting temperature (for example, about 550° C.). The forced regeneration flag $F_{DPF}$ is turned off when the estimation amount of PM deposition is reduced to a predetermined lower limit threshold (determination threshold) indicating combusting and removing (see time $t_2$ of FIG. 2). For example, the determination threshold in which the forced regeneration flag $F_{DPF}$ is turned off may be set on the basis of the upper limit elapsed time or the upper limit cumulative injection amount from the start ($F_{DPF}=1$) of the filter-forced regeneration.

[SOx Purge Control]

The SOx purge control unit 60 executes a control (hereinafter, referred to the control as an SOx purge control) which recovers the NOx occlusion reduction type catalyst 32 from SOx-poisoning by setting the exhaust gas to a rich state so as to raise the exhaust temperature to a sulfur desorption temperature (for example, about 600° C.).

FIG. 2 illustrates a timing flowchart of the SOx purge control of this embodiment. As illustrated in FIG. 2, The SOx purge control is started when a filter regeneration flag $F_{DPF}$ is turned off and an SOx purge flag $F_{SP}$ is turned on at the same time (see a time $t_2$ in FIG. 2). Thus, it is possible to efficiently shift from a state, in which the exhaust temperature is raised by forced regeneration of the filter 33, to the SOx purge control, and to effectively reduce the amount of fuel consumption.

In this embodiment, the exhaust gas is made rich using the SOx purge control, for example, in a such a manner that the SOx purge lean control that lowers the excess air ratio by an air-system control from a steady operating state (for example, about 1.5) to a first target excess air ratio (for example, about 1.3) on a lean side from a value equivalent to a theoretical air-fuel ratio (about 1.0), and the SOx purge rich control that lowers the excess air ratio by the injection system control from the first target excess air ratio to a second target excess air ratio on a rich side (for example, about 0.9) are used in combination. Hereinafter, a detail description will be given about the SOx purge lean control and the SOx purge rich control.

[Air-System Control of SOx Purge Lean Control]

Figure 3:
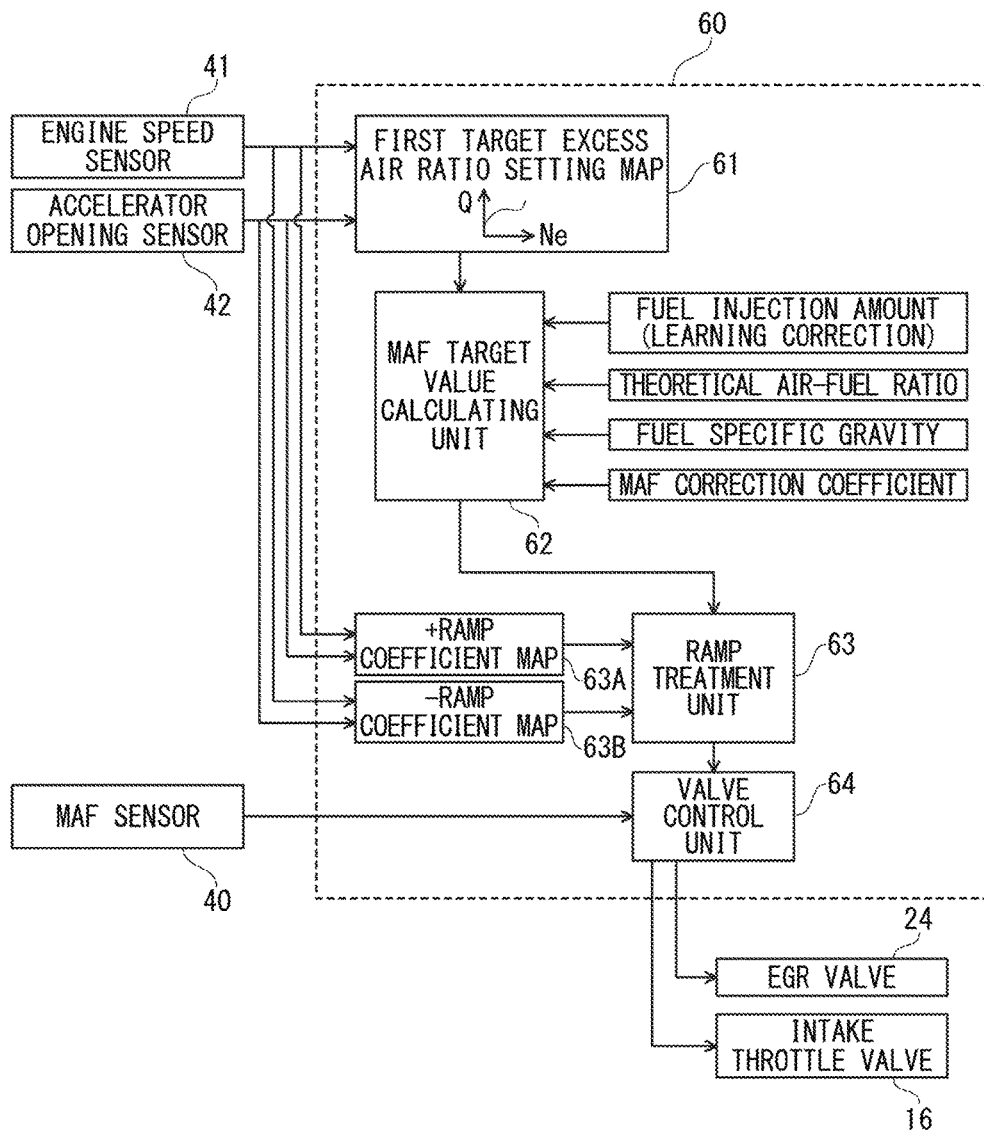
FIG. 3 is a block diagram illustrating a setting process of a MAF target value at the time of an SOx purge lean control according to this embodiment.

FIG. 3 is a block diagram illustrating a setting process of a MAF target value $MAF_{SPL\_Trgt}$ at the time of the SOx purge lean control. A first target excess air ratio setting map 61 is a map based on an engine speed Ne and an accelerator opening Q (fuel injection amount of the engine 10). An excess air ratio target value $\lambda_{SPL\_Trgt}$ (first target excess air ratio) at the time of the SOx purge lean control corresponding to the engine speed Ne and the accelerator opening Q is set on the basis of an experiment and the like in advance.

First, the excess air ratio target value $\lambda_{SPL\_Trgt}$ at the time of the SOx purge lean control is read from the first target excess air ratio setting map 61 using the engine speed Ne and the accelerator opening Q as input signals, and is input to the MAF target value calculating unit 62. In addition, in the MAF target value calculating unit 62, the MAF target value $MAF_{SPL\_Trgt}$ at time of the SOx purge lean control is calculated on the basis of the following Equation (1).

$$MAF_{SPL\_Trgt} = \lambda_{SPL\_Trgt} \times Q_{fnl\_corrd} \times Ro_{Fuel} \times AFR_{sto} / Maf_{\_corr} \quad (1)$$

In Equation (1), $Q_{fnl\_corrd}$ indicates a learning-corrected (to be described later) fuel injection amount (excluding the post injection), $Ro_{Fuel}$ indicates a fuel specific gravity, $AFR_{sto}$ indicates a theoretical air-fuel ratio, and $Maf_{\_corr}$ indicates a MAF correction coefficient (to be described later).

The MAF target value $MAF_{SPL\_Trgt}$ calculated by the MAF target value calculating unit 62 is input to a ramp treatment unit 63 when the SOx purge flag $F_{SP}$ is turned on (see time $t_2$ of FIG. 2). The ramp treatment unit 63 reads a ramp coefficient from ramp coefficient maps 63A and 63B using the engine speed Ne and the accelerator opening Q as input signals, and inputs a MAF target ramp value $MAF_{SPL\_Trgt\_Ramp}$, in which the ramp coefficient is added, to a valve control unit 64.

The valve control unit 64 executes a feedback control that throttles the intake throttle valve 16 to the shutting side and opens the EGR valve 24 to the open side such that an actual MAF value $MAF_{Act}$ input from the MAF sensor 40 becomes the MAF target ramp value $MAF_{SPL\_Trgt\_Ramp}$.

In this manner, in this embodiment, the MAF target value $MAF_{SPL\_Trgt}$ is set on the basis of the excess air ratio target value $\lambda_{SPL\_Trgt}$ read from the first target excess air ratio setting map 61 and the fuel injection amount of the in-cylinder injector 11, and an air system operation is feedback-controlled on the basis of the MAF target value $MAF_{SPL\_Trgt}$. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the SOx purge lean control.

When the fuel injection amount $Q_{fnl\_corrd}$ after the learning correction is used as the fuel injection amount of the in-cylinder injector 11, the MAF target value $MAF_{SPL\_Trgt}$ can be set by a feed-forward control to effectively exclude influence such as the aged deterioration, the property change, or the individual difference of the in-cylinder injector 11.

When the ramp coefficient set in response to the operating state of the engine 10 is added to the MAF target value $MAF_{SPL\_Trgt}$, the deterioration of the drivability and the like caused by the misfire or the torque fluctuation of the engine 10 due to the rapid change of an intake air amount can be effectively prevented.

[Fuel Injection Amount Setting of SOx Purge Rich Control]

Figure 4:
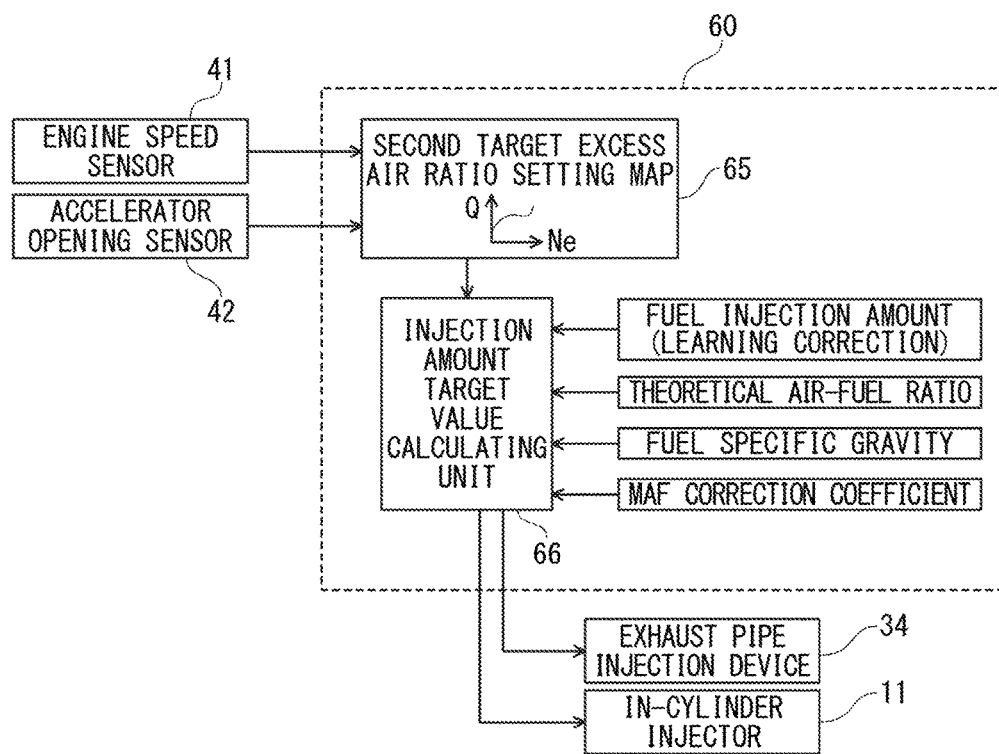
FIG. 4 is a block diagram illustrating a setting process of a target injection amount at the time of an SOx purge rich control according to this embodiment

FIG. 4 is a block diagram illustrating a setting process of the target injection amount $Q_{SPR\_Trgt}$ (injection amount per unit of time) of the exhaust pipe injection or the post injection in the SOx purge rich control. A second target excess air ratio setting map 65 is a map based on the engine speed Ne and the accelerator opening Q. The excess air ratio target value $\lambda_{SPR\_Trgt}$ (second target excess air ratio) at the time of the SOx purge rich control corresponding to the engine speed Ne and the accelerator opening Q is set on the basis of an experiment and the like in advance.

First, the excess air ratio target value $\lambda_{SPR\_Trgt}$ at the time of the SOx purge rich control is read from the second target excess air ratio setting map 65 using the engine speed Ne and the accelerator opening Q as input signals, and is input to an injection amount target value calculating unit 66. In addition, in the injection amount target value calculating unit 66, the target injection amount $Q_{SPR\_Trgt}$ at the time of the SOx purge rich control is calculated on the basis of the following Equation (2).

$$Q_{SPR\_Trgt} = MAF_{SPL\_Trgt} \times Maf_{\_corr} / (\lambda_{SPR\_Target} \times Ro_{Fuel} \times AFR_{sto}) - Q_{fnl\_corrd} \quad (2)$$

In Equation (2), $MAF_{SPL\_Trgt}$ is a MAF target value at the time of a lean SOx purge, and is input from the above-described MAF target value calculating unit 62. $Q_{fnl\_corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf_{\_corr}$ indicates a MAF correction coefficient (to be described later).

When the SOx purge rich flag $F_{SPR}$ (to be described later) is turned on, the target injection amount $Q_{SPR\_Trgt}$ calculated by the injection amount target value calculating unit 66 is transmitted as the injection instruction signal to the exhaust injector 34 or the in-cylinder injector 11.

In this manner, in this embodiment, the target injection amount $Q_{SPR\_Trgt}$ is set on the basis of the excess air ratio target value $\lambda_{SPL\_Trgt}$ read from the second target excess air ratio setting map 65 and the fuel injection amount of the injector 11. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the SOx purge rich control.

When the fuel injection amount $Q_{fnl\_corrd}$ after the learning correction is used as the fuel injection amount of the in-cylinder injector 11, the target injection amount $Q_{SPR\_Trgt}$ can be set by the feed-forward control to effectively exclude influence such as the aged deterioration, the property change, or the like of the in-cylinder injector 11.

[Catalyst Temperature Adjustment Control of SOx Purge Control]

As illustrated in times $t_2$ to $t_4$ of FIG. 2, the temperature of the exhaust gas (hereinafter, referred to as a catalyst temperature) flowing in the NOx occlusion reduction type catalyst 32 during the SOx purge control is controlled by alternately switching on and off (rich and lean) of the SOx purge rich flag $F_{SPR}$ which executes the exhaust pipe injection or the post injection. When the SOx purge rich flag $F_{SPR}$ is turned on ($F_{SPR}=1$), the catalyst temperature is raised by the exhaust pipe injection or the post injection (hereinafter, referred to a time thereof as an injection time $T_{F\_INJ}$). On the other hand, when the SOx purge rich flag $F_{SPR}$ is turned off, the catalyst temperature is lowered by the stop of the exhaust pipe injection or the post injection (hereinafter, referred to a time thereof as an interval $T_{F\_INT}$).

In this embodiment, the injection time $T_{F\_INJ}$ is set by reading a value corresponding to the engine speed Ne and the accelerator opening Q from an injection time setting map (not illustrated) created through an experiment and the like in advance. In the injection time setting map, the injection time required to reliably lower the excess air ratio of the exhaust gas obtained by an experiment and the like in advance to the second target excess air ratio is set in response to the operating state of the engine 10.

When the SOx purge rich flag $F_{SPR}$ in which the catalyst temperature is the highest is switched from the On state to the Off state, the interval $T_{F\_INT}$ is set through a feedback control. Specifically, the interval $T_{F\_INT}$ is processed by a PID control configured by a proportional control that changes an input signal in proportion to the deviation ΔT between a target catalyst temperature and an estimated catalyst temperature when the SOx purge rich flag $F_{SPR}$ is turned off, an integral control that changes the input signal in proportion to a time integral value of the deviation ΔT, and a differential control that changes the input signal in proportion to a time differential value of the deviation ΔT. The target catalyst temperature is set to such a degree as to desorb SOx from the NOx occlusion reduction type catalyst 32. The estimated catalyst temperature may be estimated by a catalyst temperature estimating unit 80 which will be described in detail below.

Figure 5:
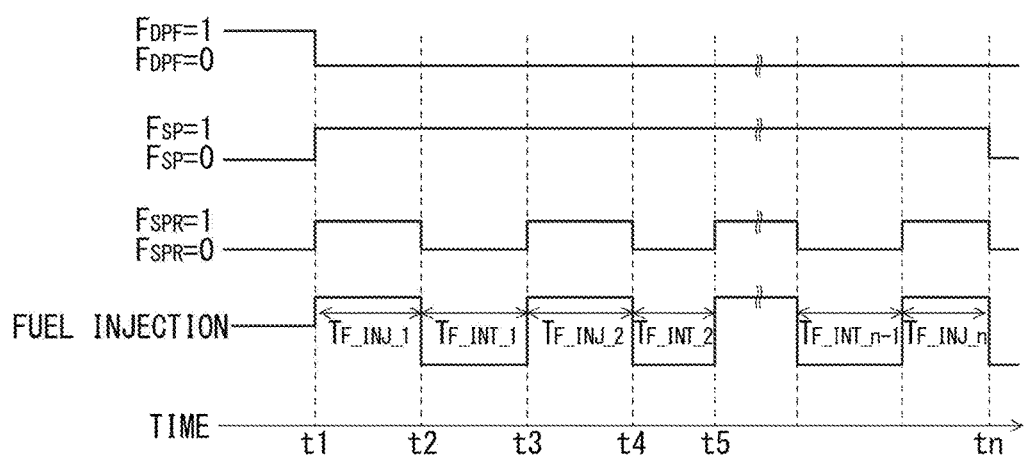
FIG. 5 is a timing chart for describing a catalyst temperature adjustment control in the SOx purge control according to this embodiment.

As illustrated in time $t_1$ of FIG. 5, when the SOx purge flag $F_{SP}$ is turned on by the end of the filter-forced regeneration, the SOx purge flag $F_{SP}$ is also turned on, and the interval $T_{F\_INT}$ feedback-calculated at the time of the previous SOx purge control is reset temporarily. That is, at first time just after the filter-forced regeneration, the exhaust pipe injection or the post injection is executed in response to the injection time $T_{F\_INJ\_1}$ set in the injection time setting map (see time from $t_1$ to $t_2$ of FIG. 5). In this manner, the SOx purge control starts from the SOx purge rich control without performing the SOx purge lean control, and thus a prompt transition to the SOx purge control can be performed and the fuel consumption amount can be reduced without lowering the exhaust temperature raised by the filter-forced regeneration.

Next, when the SOx purge rich flag $F_{SPR}$ is turned off with the lapse of the injection time $T_{F\_INJ\_1}$, the SOx purge rich flag $F_{SPR}$ is turned off until the interval $T_{F\_INT\_1}$ set by the PID control elapses (see times $t_2$ to $t_3$ of FIG. 5). In addition, when the SOx purge rich flag $F_{SPR}$ is turned on with the lapse of the interval $T_{F\_INT\_1}$, the exhaust pipe injection or the post injection according to the injection time $T_{F\_INJ\_2}$ is executed again (see time from $t_3$ to $t_4$ of FIG. 5). Thereafter, the on-and-off switching of the SOx purge rich flag $F_{SPR}$ is repeatedly executed until the SOx purge flag $F_{SP}$ is turned off (see time $t_n$ of FIG. 5) by the termination determination of the SOx purge control (to be described later).

In this manner, in this embodiment, the injection time $T_{F\_INJ}$ in which the catalyst temperature is raised and the excess air ratio is lowered to the second target excess air ratio is set from the map based on the operating state of the engine 10, and the interval $T_{F\_INT}$ in which the catalyst temperature is lowered is treated by the PID control. Accordingly, the catalyst temperature in the SOx purge control is effectively kept in the desired temperature range required for a purge, and the excess air ratio can be reliably lowered to a target excess ratio.

[Termination Determination of SOx Purge Control]

When any condition of (1) a case where the injection amount of the exhaust pipe injection or the post injection is accumulated since the SOx purge flag $F_{SP}$ is turned on, and the cumulative injection amount reaches a predetermined upper limit threshold amount, (2) a case where the elapsed time timed from the start of the SOx purge control reaches a predetermined upper limit threshold time, and (3) a case where the occlusion amount of the NOx occlusion reduction type catalyst 32 calculated on the basis of a predetermined model equation including an operating state of the engine 10, a sensor value of the NOx/lambda sensor 45, or the like as input signals is reduced to a predetermined threshold indicating SOx removal success is satisfied, the SOx purge control is terminated by turning off the SOx purge flag $F_{SP}$ (see time $t_4$ of FIG. 2 and time $t_0$ of FIG. 5).

In this manner, in this embodiment, the upper limit of the cumulative injection amount and the elapsed time is set in the termination condition of the SOx purge control so that it can be effectively prevented that the fuel consumption amount is excessive in a case where the SOx purge does not progress due to the lowering of the exhaust temperature and the like.

[NOx Purge Control]

The NOx purge control unit 70 executes a control (hereinafter, referred to as an NOx purge control) that recovers the NOx occlusion capacity of the NOx occlusion reduction type catalyst 32 by detoxifying the NOx, which is occluded in the NOx occlusion reduction type catalyst 32 when the exhaust gas is under a rich atmosphere, by reduction purification, and then discharging the NOx.

Figure 6:
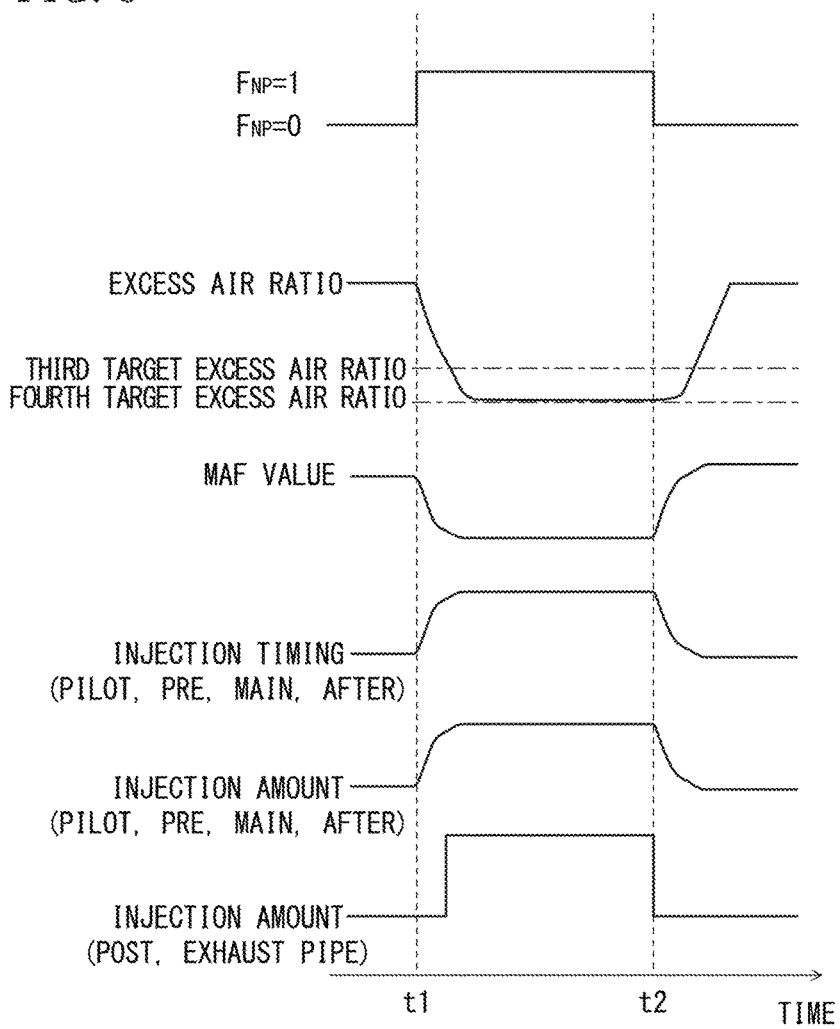
FIG. 6 is a timing chart for describing an NOx purge control according to this embodiment.

The NOx purge flag $F_{NP}$ which starts the NOx purge control is turned on when an NOx discharge amount per unit of time is estimated from the operating state of the engine 10, and an estimated accumulated value ΣNOx calculated by accumulating the NOx discharge amounts exceeds the predetermined threshold (see time $t_1$ of FIG. 6). Alternatively, the NOx purge flag $F_{NP}$ is turned on in a case where an NOx purification rate of the NOx occlusion reduction type catalyst 32 is calculated from the NOx discharge amount on the catalyst upstream side estimated from the operating state of the engine 10, and an NOx amount on the catalyst downstream side detected by the NOx/lambda sensor 45, and the NOx purification rate is lower than the predetermined determination threshold.

In this embodiment, the exhaust gas is made rich using the NOx purge control, for example, in such a manner that the NOx purge lean control that lowers the excess air ratio by an air-system control from a steady operating state (for example, about 1.5) to a third target excess air ratio (for example, about 1.3) on a lean side from a value equivalent to a theoretical air-fuel ratio (about 1.0), and the NOx purge rich control that lowers the excess air ratio by the injection system control from the third target excess air ratio to the fourth target excess air ratio on a rich side (for example, about 0.9) are used in combination. Hereinafter, the detail description will be given about the NOx purge lean control and the NOx purge rich control.

[MAF Target Value Setting of NOx Purge Lean Control]

Figure 7:
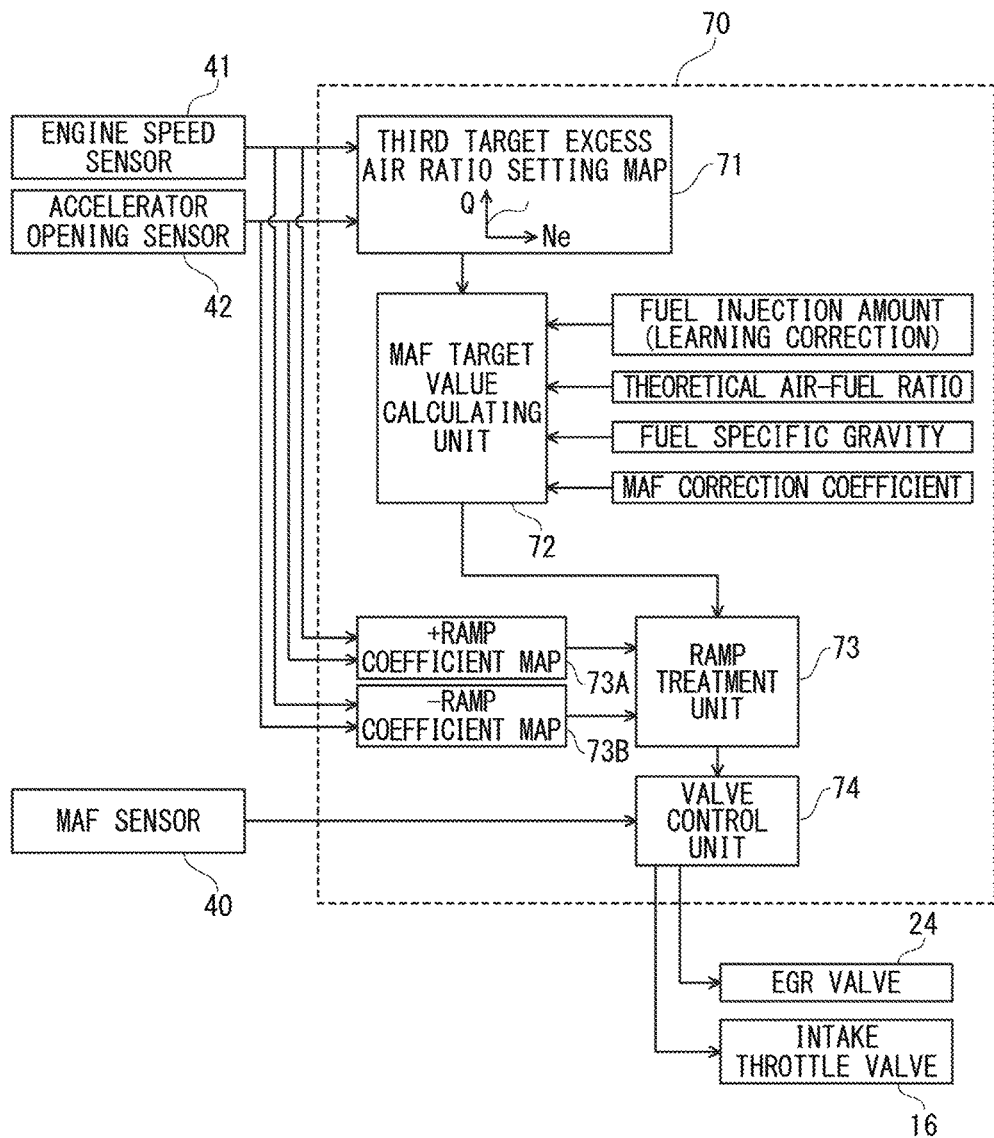
FIG. 7 is a block diagram illustrating a setting process of a MAF target value at the time of an NOx purge lean control according to this embodiment.

FIG. 7 is a block diagram illustrating a setting process of the MAF target value $MAF_{NPL\_Trgt}$ at the time of the NOx purge lean control. The third target excess air ratio setting map 71 is a map based on the engine speed Ne and the accelerator opening Q. The excess air ratio target value $\lambda_{NPL\_Trgt}$ (third target excess air ratio) at the time of the NOx purge lean control corresponding to the engine speed Ne and the accelerator opening Q is set on the basis of an experiment and the like in advance.

First, the excess air ratio target value $\lambda_{NPL\_Trgt}$ at the time of the NOx purge lean control is read from the third target excess air ratio setting map 71 using the engine speed Ne and the accelerator opening Q as input signals, and is input to the MAF target value calculating unit 72. In addition, in the MAF target value calculating unit 72, the MAF target value $MAF_{NPL\_Trgt}$ at time of the NOx purge lean control is calculated on the basis of the following Equation (3).

$$MAF_{NPL\_Trgt} = \lambda_{NPL\_Trgt} \times Q_{fnl\_corrd} \times Ro_{Fuel} \times AFR_{sto} / Maf_{\_corr} \quad (3)$$

In Equation (3), $Q_{fnl\_corrd}$ indicates a learning-corrected (to be described later) fuel injection amount (excluding the post injection), $Ro_{Fuel}$ indicates a fuel specific gravity, $AFR_{sto}$ indicates a theoretical air-fuel ratio, and $Maf_{\_corr}$ indicates a MAF correction coefficient (to be described later).

The MAF target value $MAF_{NPL\_Trgt}$ calculated by the MAF target value calculating unit 72 is input to a ramp treatment unit 73 when the NOx purge flag $F_{NP}$ is turned on (see time $t_1$ of FIG. 6). The ramp treatment unit 73 reads a ramp coefficient from a plus ramp coefficient map 73A and a minus ramp coefficient map 73B using the engine speed Ne and the accelerator opening Q as input signals, and inputs a MAF target ramp value $MAF_{NPL\_Trgt\_Ramp}$, in which the ramp coefficient is added, to a valve control unit 74.

The valve control unit 74 executes a feedback control that throttles the intake throttle valve 16 to the shutting side and opens the EGR valve 24 to the open side such that the actual MAF value $MAF_{Act}$ input from the MAF sensor 40 becomes the MAF target ramp value $MAF_{NPL\_Trgt\_Ramp}$.

In this manner, in this embodiment, the MAF target value $MAF_{NPL\_Trgt}$ is set on the basis of the excess air ratio target value $\lambda_{NPL\_Trgt}$ read from the third target excess air ratio setting map 71 and the fuel injection amount of the in-cylinder injector 11, and an air system operation is feedback-controlled on the basis of the MAF target value $MAF_{NPL\_Trgt}$. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge lean control.

When the fuel injection amount $Q_{fnl\_corrd}$ after the learning correction is used as the fuel injection amount of the in-cylinder injector 11, the MAF target value $MAF_{NPL\_Trgt}$ can be set by a feed-forward control to effectively exclude influence such as the aged deterioration, the property change, or the like of the in-cylinder injector 11.

When the ramp coefficient set in response to the operating state of the engine 10 is added to the MAF target value $MAF_{NPL\_Trgt}$, the deterioration of the drivability and the like caused by the misfire or the torque fluctuation of the engine 10 due to the rapid change of the intake air amount can be effectively prevented.

[Fuel Injection Amount Setting of NOx Purge Rich Control]

Figure 8:
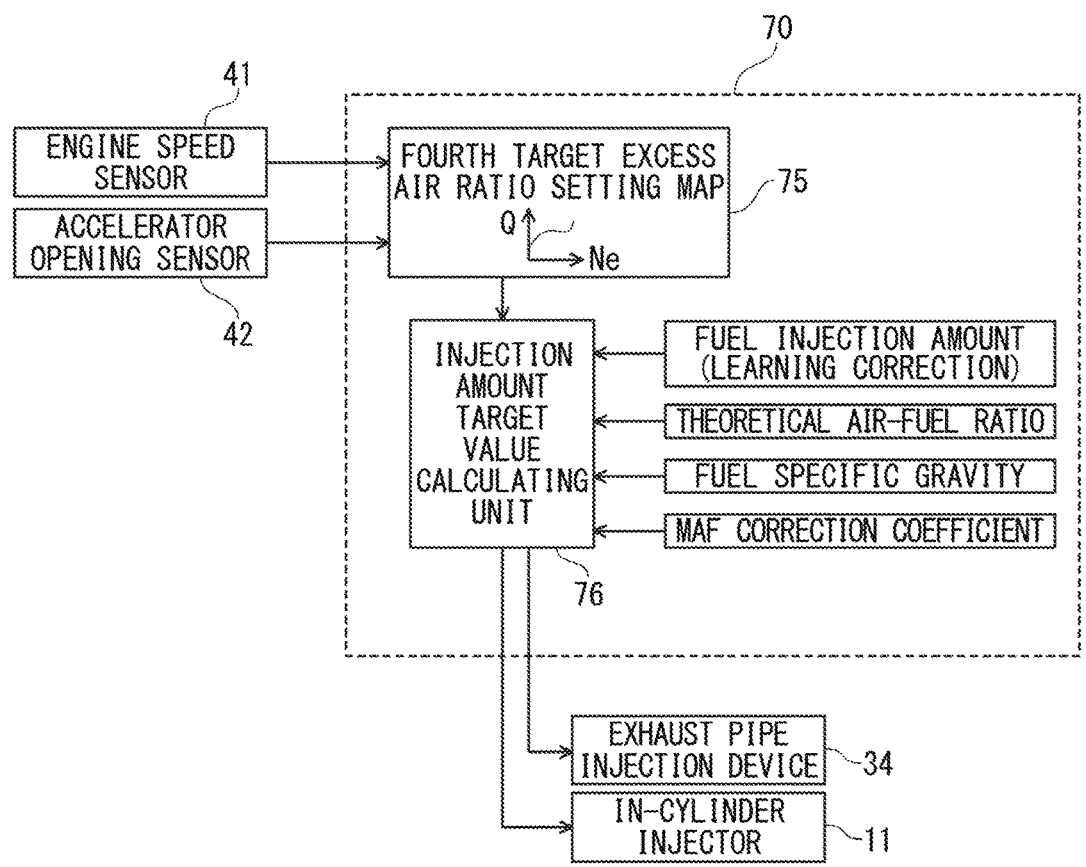
FIG. 8 is a block diagram illustrating a setting process of a target injection amount at the time of an NOx purge rich control according to this embodiment.

FIG. 8 is a block diagram illustrating a setting process of the target injection amount $Q_{NPR\_Trgt}$ (injection amount per unit of time) of the exhaust pipe injection or the post injection in the NOx purge rich control. A fourth target excess air ratio setting map 75 is a map based on the engine speed Ne and the accelerator opening Q. The excess air ratio target value $\lambda_{NPR\_Trgt}$ (fourth target excess air ratio) at the time of the NOx purge rich control corresponding to the engine speed Ne and the accelerator opening Q is set on the basis of an experiment and the like in advance.

First, the excess air ratio target value $\lambda_{NPR\_Trgt}$ at the time of the NOx purge rich control is read from the fourth target excess air ratio setting map 75 using the engine speed Ne and the accelerator opening Q as input signals, and is input to an injection amount target value calculating unit 76. In addition, in the injection amount target value calculating unit 76, the target injection amount $Q_{NPR\_Trgt}$ at the time of the NOx purge rich control is calculated on the basis of the following Equation (4).

$$Q_{NPR\_Trgt} = MAF_{NPL\_Trgt} \times Maf_{\_corr} / (\lambda_{NPR\_Target} \times Ro_{Fuel} \times AFR_{sto}) - Q_{fnl\_corrd} \quad (4)$$

In Equation (4), $MAF_{NPL\_Trgt}$ is a MAF target value at the time of a lean NOx purge, and is input from the above-described MAF target value calculating unit 72. $Q_{fnl\_corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and $Maf_{\_corr}$ indicates a MAF correction coefficient (to be described later).

When the NOx purge flag $F_{NP}$ is turned on, the target injection amount $Q_{NPR\_Trgt}$ calculated by the injection amount target value calculating unit 76 is transmitted as the injection instruction signal to the exhaust injector 34 or the in-cylinder injector 11 (time $t_1$ of FIG. 6). The transmission of the injection instruction signal is continued until the NOx purge flag $F_{NP}$ is turned off (time $t_2$ of FIG. 6) by the termination determination of the NOx purge control (to be described later).

In this manner, in this embodiment, the target injection amount $Q_{NPR\_Trgt}$ is set on the basis of the excess air ratio target value $\lambda_{NPR\_Trgt}$ read from the fourth target excess air ratio setting map 75 and the fuel injection amount of the in-cylinder injector 11. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge rich control.

When the fuel injection amount $Q_{fnl\_corrd}$ after the learning correction is used as the fuel injection amount of the in-cylinder injector 11, the target injection amount $Q_{NPR\_Trgt}$ can be set by the feed-forward control to effectively exclude influence such as the aged deterioration, the property change, or the like of the in-cylinder injector 11.

[Termination Determination of NOx Purge Control]

When any condition of (1) a case where the injection amount of the exhaust pipe injection or the post injection is accumulated since the NOx purge flag $F_{NP}$ is turned on, and the cumulative injection amount reaches a predetermined upper limit threshold amount, (2) a case where the elapsed time timed from the start of the NOx purge control reaches the predetermined upper limit threshold time, and (3) a case where the NOx occlusion amount of the NOx occlusion reduction type catalyst 32 calculated on the basis of a predetermined model equation including an operating state of the engine 10, a sensor value of the NOx/lambda sensor 45, or the like as input signals is reduced to a predetermined threshold indicating NOx removal success is satisfied, the NOx purge control is terminated by turning off the NOx purge flag $F_{NP}$ (see time $t_2$ of FIG. 6).

In this manner, in this embodiment, the upper limit of the cumulative injection amount and the elapsed time is set in the termination condition of the NOx purge control so that it can be reliably prevented that the fuel consumption amount is excessive in a case where the NOx purge does not succeed due to the lowering of the exhaust temperature and the like.

[Setting of Initial Catalyst Temperature Value]

Figure 9A:
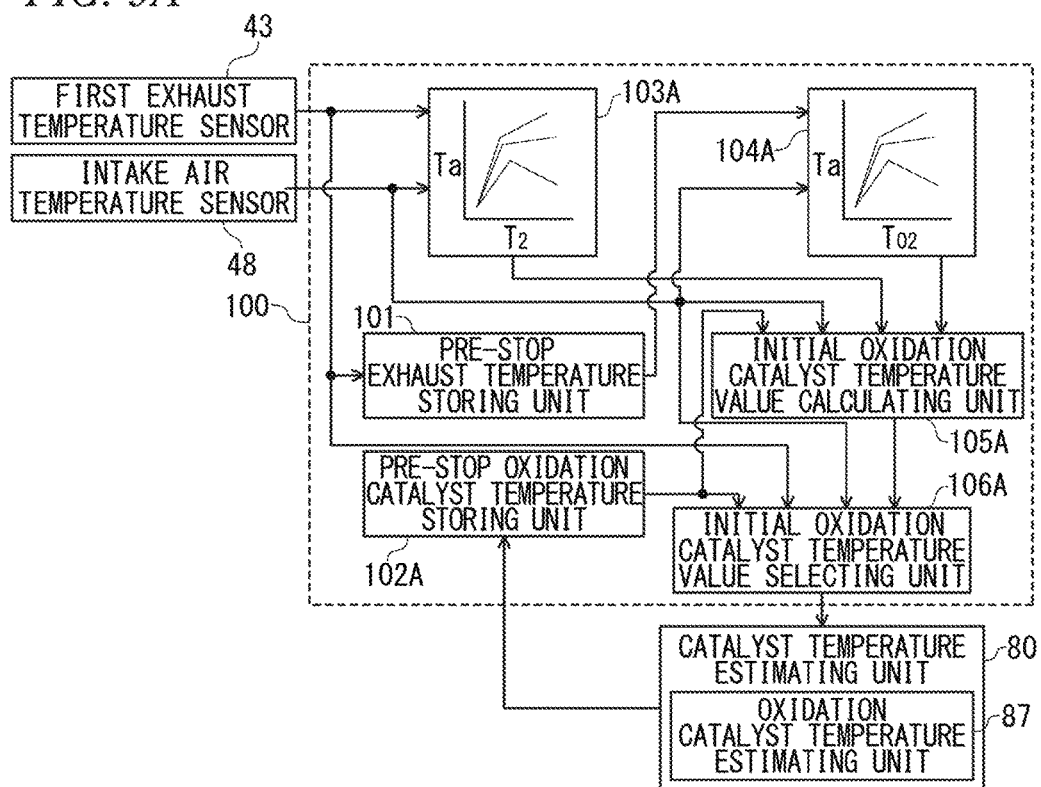
FIG. 9A is a block diagram illustrating a process of setting an initial catalyst temperature value of an oxidation catalyst using an initial catalyst temperature value setting unit.

FIG. 9A is a block diagram illustrating a process of setting an initial catalyst temperature value of the oxidation catalyst 31 using an initial catalyst temperature value setting unit 100.

A pre-stop exhaust temperature storing unit 101 is an example of a first exhaust temperature storing unit of this disclosure, and stores the exhaust temperature detected by the first exhaust temperature sensor 43 immediately before the engine 10 is stopped. A pre-stop oxidation catalyst temperature storing unit 102A is an example of a pre-stop catalyst temperature storing unit of this disclosure, and stores the oxidation catalyst temperature estimated by an oxidation catalyst temperature estimating unit 87 immediately before the engine 10 is stopped. Estimation of the oxidation catalyst temperature in the oxidation catalyst temperature estimating unit 87 will be described below.

A first calculation value acquiring unit 103A is an example of an initial catalyst temperature setting unit of this disclosure, and acquires a calculation value $A_{103A}$ of Equation (5), based on an exhaust gas $T_2$ detected by the first exhaust temperature sensor 43 (an example of a second exhaust temperature acquiring unit of this disclosure) at the time of the start of the engine 10 and similarly, an intake air temperature $T_a$ detected by an intake air temperature sensor 48 (an example of an intake air temperature acquiring unit of this disclosure) at the time of the start of the engine 10, Equation (5) corresponding to a set of the exhaust gas $T_2$ and the intake air temperature $T_a$. In the embodiment, the first calculation value acquiring unit 103A includes a map in which a combination of the exhaust gas $T_2$ and the intake air temperature $T_a$ is associated with the calculation value $A_{103A}$.

$$A_{103A}=(T_2-T_a)^{K1\_DOC/K2} \quad (5)$$

In Equation (5), K1_DOC indicates a heat radiation coefficient of the oxidation catalyst 31, and K2 indicates a heat radiation coefficient of the first exhaust temperature sensor 43. The heat radiation coefficients K1_DOC and K2 are determined based on an actual measurement value.

A second calculation value acquiring unit 104A is an example of an initial catalyst temperature setting unit of this disclosure, and acquires a calculation value $B_{104A}$ of Equation (6), based on an exhaust gas $T_{02}$ stored in the pre-stop exhaust temperature storing unit 101 immediately before the engine 10 is stopped and the intake air temperature $T_a$ at the time of the start of the engine 10, Equation (6) corresponding to a set of the exhaust gas $T_{02}$ and the intake air temperature $T_a$. In the embodiment, the second calculation value acquiring unit 104A includes a map in which a combination of the exhaust gas $T_{02}$ and the intake air temperature $T_a$ is associated with the calculation value $B_{104A}$.

$$B_{104A}=(T_{02}-T_a)^{K1\_DOC/K2} \quad (6)$$

An initial oxidation catalyst temperature value calculating unit 105A is an example of an initial catalyst temperature setting unit of this disclosure, and calculates Equation (7) based on the intake air temperature $T_a$ at the time of the start of the engine 10, the calculation value $A_{103A}$ acquired by the first calculation value acquiring unit 103A, the calculation value $B_{104A}$ acquired by the second calculation value acquiring unit 104A, and an oxidation catalyst temperature $T_{01\_DOC}$ stored in the catalyst temperature storing unit 102A immediately before the engine 10 is stopped, thereby calculating a temporary initial value $T_{1\_DOC}$ of the oxidation catalyst temperature.

$$T_{1\_DOC}=T_a+A_{103A}/B_{104A} \cdot (T_{01\_DOC}-T_a) \quad (7)$$

An initial oxidation catalyst value selecting unit 106A is an example of an initial catalyst temperature setting unit of this disclosure, and selects an initial oxidation catalyst temperature based on the temporary initial value $T_{1\_DOC}$ calculated by the initial oxidation catalyst temperature value calculating unit 105A, the exhaust gas $T_2$ detected by the first exhaust temperature sensor 43, the exhaust gas $T_{02}$ stored in the pre-stop exhaust temperature storing unit 101, and the intake air temperature $T_a$ detected by the intake air temperature sensor 48.

Specifically, the initial oxidation catalyst value selecting unit 106A (1) when the exhaust gas $T_2$ detected by the first exhaust temperature sensor 43 is higher than the exhaust gas $T_{02}$ stored in the pre-stop exhaust temperature storing unit 101, selects the oxidation catalyst temperature $T_{01\_DOC}$ stored in the pre-stop catalyst temperature storing unit 102A as an initial temperature value of the oxidation catalyst 31, (2) when the intake air temperature $T_a$ detected by the intake air temperature sensor 48 is higher than the exhaust gas $T_{02}$ stored in the pre-stop exhaust temperature storing unit 101, selects the intake air temperature $T_a$ as an initial temperature value of the oxidation catalyst 31 even if the oxidation catalyst temperature $T_{01\_DOC}$ is set to the initial temperature value of the oxidation catalyst 31 in (1) described above, and (3) if not (1) and (2) described above, selects the temporary initial value $T_{1\_DOC}$ as an initial temperature value of the oxidation catalyst 31.

The initial temperature value selected by the initial oxidation catalyst value selecting unit 106A is used as an initial value of the oxidation catalyst 31 in a temperature estimation process by a catalyst temperature estimating unit 80 (oxidation catalyst temperature estimating unit 87).

As described above, the initial value of the oxidation catalyst temperature is calculated based on the exhaust gas $T_{02}$ detected by the first exhaust temperature sensor 43 immediately before the engine 10 is stopped, the oxidation catalyst temperature $T_{01\_DOC}$ estimated by the oxidation catalyst temperature estimating unit 87 immediately before the engine 10 is stopped, the exhaust gas $T_2$ detected by the first exhaust temperature sensor 43 at the time of the start of the engine 10, the intake air temperature $T_a$ detected by the intake air temperature sensor 48 at the time of the start of the engine 10, the heat radiation coefficient K1_DOC of the oxidation catalyst 31, and the heat radiation coefficient K2 of the first exhaust temperature sensor 43, and thus the initial value of the oxidation catalyst temperature can be acquired with high accuracy.

Figure 9B:
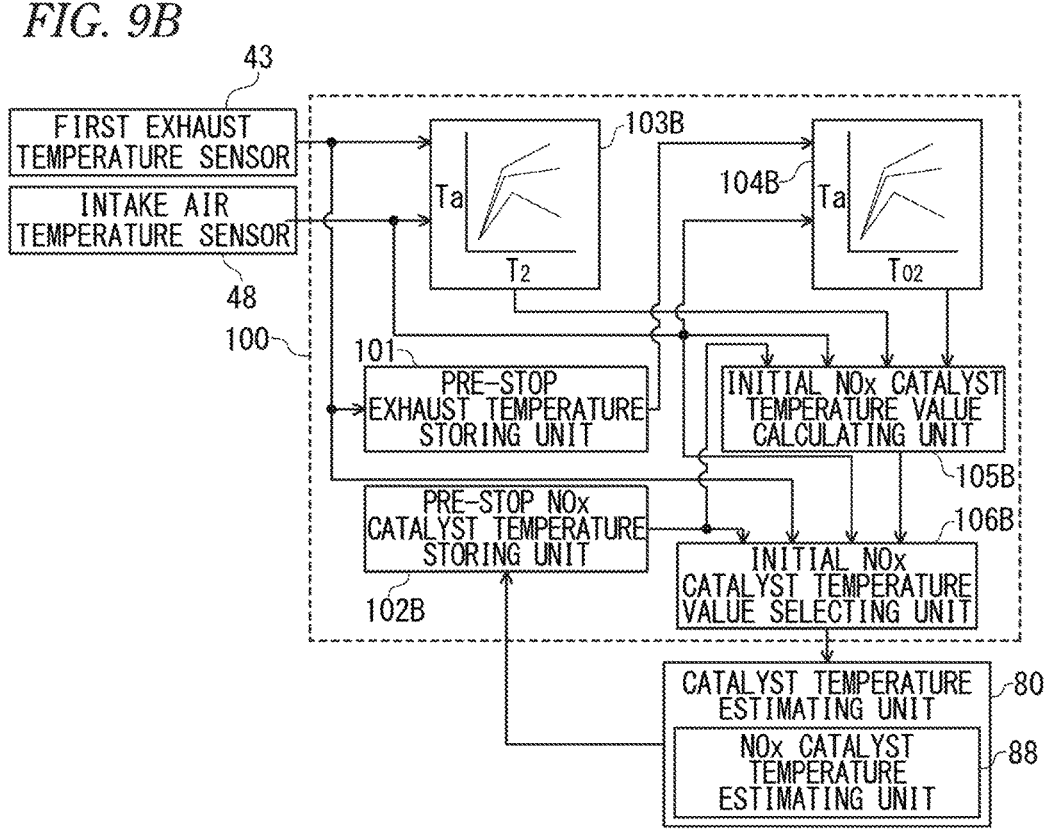
FIG. 9B is a block diagram illustrating a process of setting an initial catalyst temperature value of an NOx occlusion reduction type catalyst using an initial catalyst temperature value setting unit.

FIG. 9B is a block diagram illustrating a process of setting an initial catalyst temperature value of the NOx occlusion reduction type catalyst 32 using the initial catalyst temperature value setting unit 100.

The pre-stop exhaust temperature storing unit 101 is an example of a first exhaust temperature storing unit of this disclosure, and stores the exhaust temperature detected by the first exhaust temperature sensor 43 immediately before the engine 10 is stopped. A pre-stop NOx catalyst temperature storing unit 102B is an example of a pre-stop catalyst temperature storing unit of this disclosure, and stores a temperature (hereinafter, referred to as an NOx catalyst temperature) of the NOx occlusion reduction type catalyst 32 estimated by an NOx catalyst temperature estimating unit 88 immediately before the engine 10 is stopped. Estimation of the NOx catalyst temperature in the NOx catalyst temperature estimating unit 88 will be described below.

A first calculation value acquiring unit 103B is an example of an initial catalyst temperature setting unit of this disclosure, and acquires a calculation value $A_{103B}$ of Equation (8), based on an exhaust gas $T_2$ detected by the first exhaust temperature sensor 43 (an example of a second exhaust temperature acquiring unit of this disclosure) at the time of the start of the engine 10 and similarly, an intake air temperature $T_a$ detected by an intake air temperature sensor 48 (an example of an intake air temperature acquiring unit of this disclosure) at the time of the start of the engine 10, Equation (8) corresponding to a set of the exhaust gas $T_2$ and the intake air temperature $T_a$. In the embodiment, the first calculation value acquiring unit 103B includes a map in which a combination of the exhaust gas $T_2$ and the intake air temperature $T_a$ is associated with the calculation value $A_{103B}$.

$$A_{103B}=(T_2-T_a)^{K1\_NOx/K2} \quad (8)$$

In Equation (8), K1_NOx indicates a heat radiation coefficient of the NOx occlusion reduction type catalyst 32, and K2 indicates a heat radiation coefficient of the first exhaust temperature sensor 43. The heat radiation coefficients K1_NOx and K2 are determined based on an actual measurement value.

A second calculation value acquiring unit 104B is an example of an initial catalyst temperature setting unit of this disclosure, and acquires a calculation value $B_{104B}$ of Equation (9), based on an exhaust gas $T_{02}$ stored in the pre-stop exhaust temperature storing unit 101 immediately before the engine 10 is stopped and the intake air temperature $T_a$ at the time of the start of the engine 10, Equation (9) corresponding to a set of the exhaust gas $T_{02}$ and the intake air temperature $T_a$. In the embodiment, the second calculation value acquiring unit 104B includes a map in which a combination of the exhaust gas $T_{02}$ and the intake air temperature $T_a$ is associated with the calculation value $B_{104B}$.

$$B_{104B}=(T_{02}-T_a)^{K1\_NOx/K2} \quad (9)$$

An initial NOx catalyst temperature value calculating unit 105B is an example of an initial catalyst temperature setting unit of this disclosure, and calculates Equation (10) based on the intake air temperature $T_a$ at the time of the start of the engine 10, the calculation value $A_{103B}$ acquired by the first calculation value acquiring unit 103B, the calculation value $B_{104B}$ acquired by the second calculation value acquiring unit 104B, and an NOx catalyst temperature $T_{01\_NOx}$ stored in the catalyst temperature storing unit 102B immediately before the engine 10 is stopped, thereby calculating a temporary initial value $T_{1\_NOx}$ of the NOx catalyst temperature.

$$T_{1\_NOx}=T_a+A_{103B}/B_{104B}\cdot(T_{01\_NOx}-T_a) \quad (10)$$

An initial NOx catalyst value selecting unit 106B is an example of an initial catalyst temperature setting unit of this disclosure, and selects an initial NOx catalyst temperature based on the temporary initial value $T_{1\_NOx}$ calculated by the initial NOx catalyst temperature value calculating unit 105B, the exhaust gas $T_2$ detected by the first exhaust temperature sensor 43, the exhaust gas $T_{02}$ stored in the pre-stop exhaust temperature storing unit 101, and the intake air temperature $T_a$ detected by the intake air temperature sensor 48.

Specifically, the initial NOx catalyst value selecting unit 106B (1) when the exhaust gas $T_2$ detected by the first exhaust temperature sensor 43 is higher than the exhaust gas $T_{02}$ stored in the pre-stop exhaust temperature storing unit 101, selects the NOx catalyst temperature $T_{01\_NOx}$ stored in the pre-stop catalyst temperature storing unit 102B as an initial temperature value of the NOx occlusion reduction type catalyst 32, (2) when the intake air temperature $T_a$ detected by the intake air temperature sensor 48 is higher than the exhaust gas $T_{02}$ stored in the pre-stop exhaust temperature storing unit 101, selects the intake air temperature $T_a$ as an initial temperature value of the NOx occlusion reduction type catalyst 32 even if the NOx catalyst temperature $T_{01\_NOx}$ is set to the initial temperature value of the NOx occlusion reduction type catalyst 32 in (1) described above, and (3) if not (1) and (2) described above, selects the temporary initial value $T_{1\_NOx}$ as an initial temperature value of the NOx occlusion reduction type catalyst 32.

The initial temperature value selected by the initial NOx catalyst value selecting unit 106B is used as an initial value of the NOx occlusion reduction type catalyst 32 in a temperature estimation process by a catalyst temperature estimating unit 80 (NOx catalyst temperature estimating unit 88).

As described above, the initial value of the NOx catalyst temperature is calculated based on the exhaust gas $T_{02}$ detected by the first exhaust temperature sensor 43 immediately before the engine 10 is stopped, the NOx catalyst temperature $T_{01\_NOx}$ estimated by the NOx catalyst temperature estimating unit 88 immediately before the engine 10 is stopped, the exhaust gas $T_2$ detected by the first exhaust temperature sensor 43 at the time of the start of the engine 10, the intake air temperature $T_a$ detected by the intake air temperature sensor 48 at the time of the start of the engine 10, the heat radiation coefficient K1_NOx of the NOx occlusion reduction type catalyst 32, and the heat radiation coefficient K2 of the first exhaust temperature sensor 43, and thus the initial value of the NOx catalyst temperature can be acquired with high accuracy.

[Estimation of Catalyst Temperature]

Figure 10:
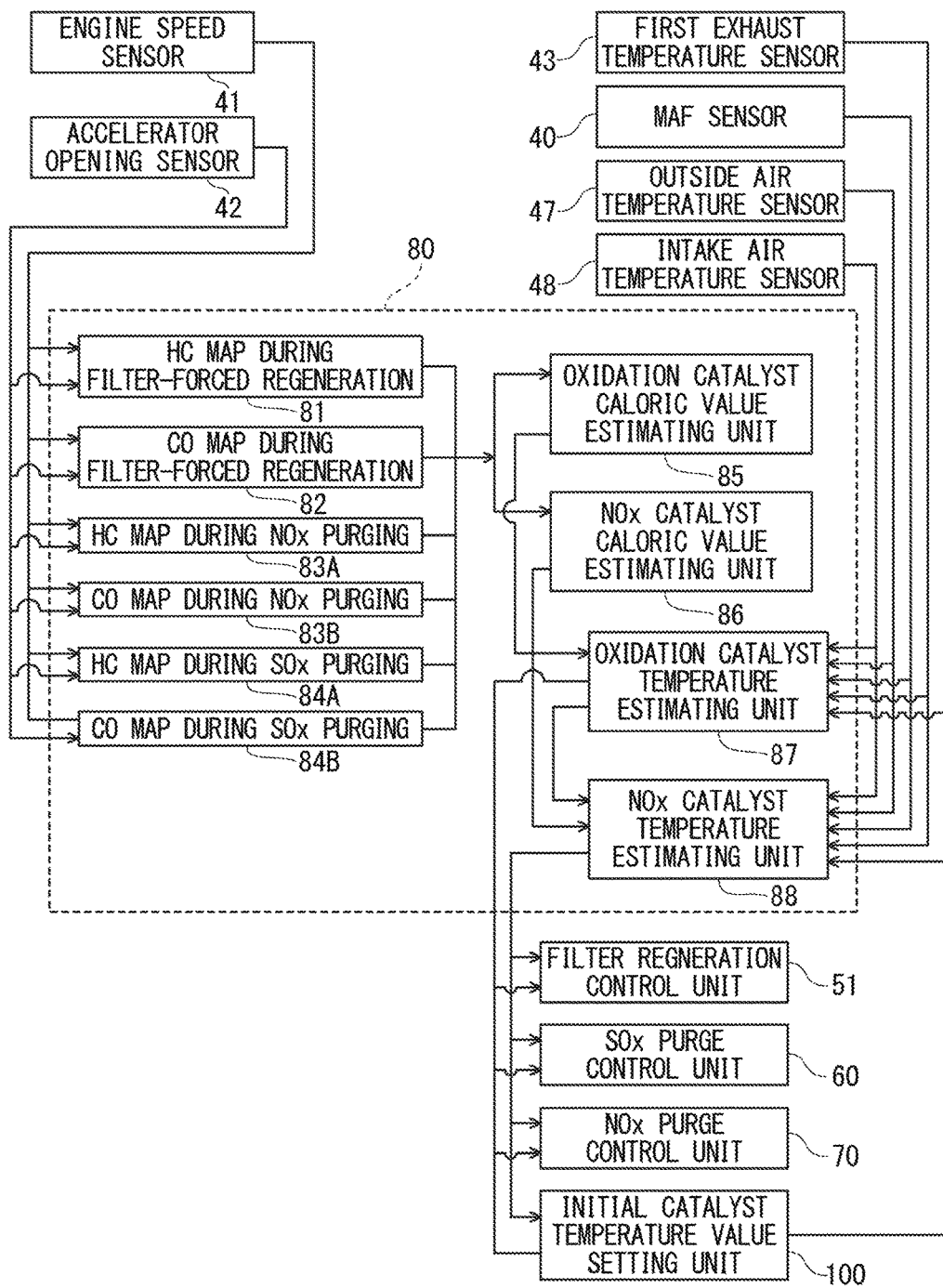
FIG. 10 is a block diagram illustrating a catalyst temperature estimating process according to this embodiment.

FIG. 10 is a block diagram illustrating a process of estimating the oxidation catalyst temperature and the NOx catalyst temperature using the catalyst temperature estimating unit 80 which is an example of a catalyst temperature estimating unit of this disclosure.

An HC map 81 during filter-forced regeneration is a map based on an operating state of the engine 10, and the amount of HC (hereinafter, referred to as an HC discharge amount during filter regeneration) to be discharged from the engine 10 at the time of control of the filter-forced regeneration is set through experiment or the like in advance. When the forced regeneration flag $F_{DPF}$ is turned on ($F_{DPF}=1$), the HC discharge amount during the filter regeneration read from the HC map 81 during the filter-forced regeneration based on the engine speed Ne and the accelerator opening Q is multiplied by a predetermined correction coefficient depending on the operating state of the engine 10, and is transmitted to an oxidation catalyst caloric value estimating unit 85 and an NOx catalyst caloric value estimating unit 86.

A CO map 82 during filter-forced regeneration is a map based on an operating state of the engine 10, and the amount of CO (hereinafter, referred to as a CO discharge amount during filter regeneration) to be discharged from the engine 10 at the time of control of the filter-forced regeneration is set through experiment or the like in advance. When the forced regeneration flag $F_{DPF}$ is turned on ($F_{DPF}=1$), the CO discharge amount during the filter regeneration read from the CO map 82 during the filter-forced regeneration based on the engine speed Ne and the accelerator opening Q is multiplied by a predetermined correction coefficient depending on the operating state of the engine 10, and is transmitted to each of the caloric value estimating units 85 and 86.

An HC map 83A during NOx purging is a map based on an operating state of the engine 10, and the amount of HC (hereinafter, referred to as an HC discharge amount during the NOx purging) to be discharged from the engine 10 at the time of the NOx purging is set through experiment or the like in advance. When the NOx purge flag $F_{NP}$ is turned on ($F_{NP}=1$), the HC discharge amount during the NOx purging read from the HC map 83A during the NOx purging based on the engine speed Ne and the accelerator opening Q is multiplied by a predetermined correction coefficient depending on the operating state of the engine 10, and is transmitted to each of the caloric value estimating units 85 and 86.

A CO map 83B during NOx purging is a map based on an operating state of the engine 10, and the amount of CO (hereinafter, referred to as a CO discharge amount during the NOx purging) to be discharged from the engine 10 at the time of the NOx purging is set through experiment or the like in advance. When the NOx purge flag $F_{NP}$ is turned on ($F_{NP}=1$), the CO discharge amount during the NOx purging read from the CO map 83B during the NOx purging based on the engine speed Ne and the accelerator opening Q is multiplied by a predetermined correction coefficient depending on the operating state of the engine 10, and is transmitted to each of the caloric value estimating units 85 and 86.

An HC map 84A during SOx purging is a map based on an operating state of the engine 10, and the amount of HC (hereinafter, referred to as an HC discharge amount during the SOx purging) to be discharged from the engine 10 at the time of the control of the SOx purging is set through experiment or the like in advance. When the SOx purge flag $F_{SP}$ is turned on ($F_{SP}=1$), the HC discharge amount during the SOx purging read from the HC map 84A during the SOx purging based on the engine speed Ne and the accelerator opening Q is multiplied by a predetermined correction coefficient depending on the operating state of the engine 10, and is transmitted to each of the caloric value estimating units 85 and 86.

A CO map 84B during SOx purging is a map based on an operating state of the engine 10, and the amount of CO (hereinafter, referred to as a CO discharge amount during the SOx purging) to be discharged from the engine 10 at the time of the control of the SOx purging is set through experiment or the like in advance. When the SOx purge flag $F_{SP}$ is turned on ($F_{SP}=1$), the CO discharge amount during the SOx purging read from the CO map 84B during the SOx purging based on the engine speed Ne and the accelerator opening Q is multiplied by a predetermined correction coefficient, and is transmitted to each of the caloric value estimating units 85 and 86.

The oxidation catalyst caloric value estimating unit 85 estimates HC/CO caloric values (hereinafter, referred to as oxidation catalyst HC/CO caloric values) inside the oxidation catalyst 31 based on the HC/CO discharge amounts input from each of the maps 81 to 84B according to the SOx purge flag $F_{SP}$, the forced regeneration flag $F_{DPF}$, and the like. The oxidation catalyst HC/CO caloric values may be estimated and calculated based on a model expression or a map including, for example, the HC/CO discharge amounts transmitted from each of the maps 81 to 84B as input values.

The NOx catalyst caloric value estimating unit 86 estimates HC/CO caloric values (hereinafter, referred to as NOx catalyst HC/CO caloric values) inside the NOx occlusion reduction type catalyst 32 based on the HC/CO discharge amounts input from each of the maps 81 to 84B according to the SOx purge flag $F_{SP}$, the forced regeneration flag $F_{DPF}$, and the like. The NOx catalyst HC/CO caloric values may be estimated and calculated based on a model expression or a map including, for example, the HC/CO discharge amounts transmitted from each of the maps 81 to 84B as input values.

The oxidation catalyst temperature estimating unit 87 estimates and calculates the catalyst temperature of the oxidation catalyst 31 based on a model expression or a map including an inlet temperature of the oxidation catalyst detected by the first exhaust temperature sensor 43, the oxidation catalyst HC/CO caloric values input from the oxidation catalyst caloric value estimating unit 85, the sensor value of the MAF sensor 40, the amount of heat radiated to the outside air estimated from the sensor value of the outside air temperature sensor 47 or the intake air temperature sensor 48, and the initial value of the oxidation catalyst temperature set by the initial catalyst temperature value setting unit 100, as input values. The estimated and calculated oxidation catalyst temperature is referred to by the filter regeneration control unit 51, the SOx purge control unit 60, and the NOx purge control unit 70.

Since the oxidation catalyst temperature estimating unit 87 performs estimation and calculation using the initial value, which is set by the initial catalyst temperature value setting unit 100, as the initial value of the oxidation catalyst temperature, the difference between the actual temperature and the estimated value of the oxidation catalyst 31 at the time of the start of the engine 10 is suppressed, and the error can be made small at an early stage. Thus, at the time of execution of the SOx purge control or the NOx purge control, it is possible to suppress troubles, for example, reduction of the NOx purification rate due to non-execution of the rich control with the rich controllable temperature or the occurrence of white smoke due to execution of the rich control with the rich control prohibiting temperature.

During motoring in which fuel injection of the engine 10 is stopped, the exothermic reaction of HC/CO inside the oxidation catalyst 31 disappears or decreased negligibly. For this reason, during the motoring, the oxidation catalyst temperature is estimated and calculated based on the inlet temperature of the oxidation catalyst, the MAF sensor value, and the amount of heat to be radiated to the outside air without using the oxidation catalyst HC/CO caloric values input from the oxidation catalyst caloric value estimating unit 85

The NOx catalyst temperature estimating unit 88 estimates and calculates the catalyst temperature of the NOx occlusion reduction type catalyst 32 based on a model expression or a map including the oxidation catalyst temperature (hereinafter, referred to as an inlet temperature of the NOx catalyst) input from the oxidation catalyst temperature estimating unit 87, the NOx catalyst HC/CO caloric values input from the NOx catalyst caloric value estimating unit 86, the amount of heat radiated to the outside air estimated from the sensor value of the outside air temperature sensor 47 or the intake air temperature sensor 48, and the initial value of the NOx catalyst temperature set by the initial catalyst temperature value setting unit 100, as input values. The estimated and calculated NOx catalyst temperature is referred to by the filter regeneration control unit 51, the SOx purge control unit 60, and the NOx purge control unit 70.

Since the NOx catalyst temperature estimating unit 88 performs estimation and calculation using the initial value, which is set by the initial catalyst temperature value setting unit 100, as the initial value of the NOx catalyst temperature, the difference between the actual temperature and the estimated value of the NOx occlusion reduction type catalyst 32 at the time of the start of the engine 10 is suppressed, and the error can be made small at an early stage. Thus, at the time of execution of the SOx purge control or the NOx purge control, it is possible to suppress troubles, for example, reduction of the NOx purification rate due to non-execution of the rich control with the rich controllable temperature or the occurrence of white smoke due to execution of the rich control with the rich control prohibiting temperature.

During motoring in which fuel injection of the engine 10 is stopped, the exothermic reaction of HC/CO inside the NOx occlusion reduction type catalyst 32 disappears or decreased negligibly. For this reason, during the motoring, the NOx catalyst temperature is estimated and calculated based on the inlet temperature of the NOx catalyst, the MAF sensor value, and the amount of heat to be radiated to the outside air without using the NOx catalyst HC/CO caloric values input from the NOx catalyst caloric value estimating unit 86.

[MAF Follow-Up Control]

In (1) a time of switching from the lean state of a regular operation to the rich state through the SOx purge control or the NOx purge control, and (2) a time of switching the rich state to the lean state of the regular operation through the SOx purge control or the NOx purge control, the MAF follow-up control unit 98 executes a control to correct the fuel injection timing and the fuel injection amount of each in-cylinder injector 11 in response to a MAF change (MAF follow-up control).

[Injection Amount Learning Correction]

Figure 11:
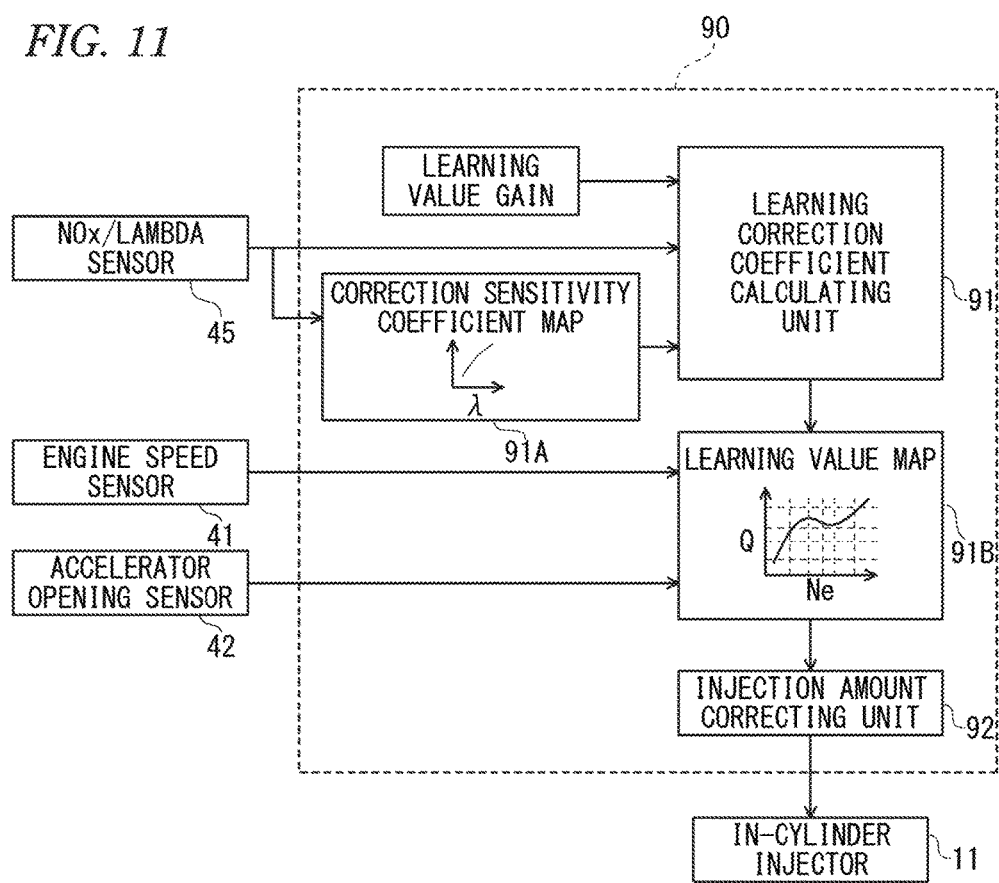
FIG. 11 is a block diagram illustrating a process of an injection amount learning correction of an injector according to this embodiment.

As illustrated in FIG. 11, the injection amount learning correction unit 90 includes a learning correction coefficient calculating unit 91 and an injection amount correcting unit 92.

Figure 12:
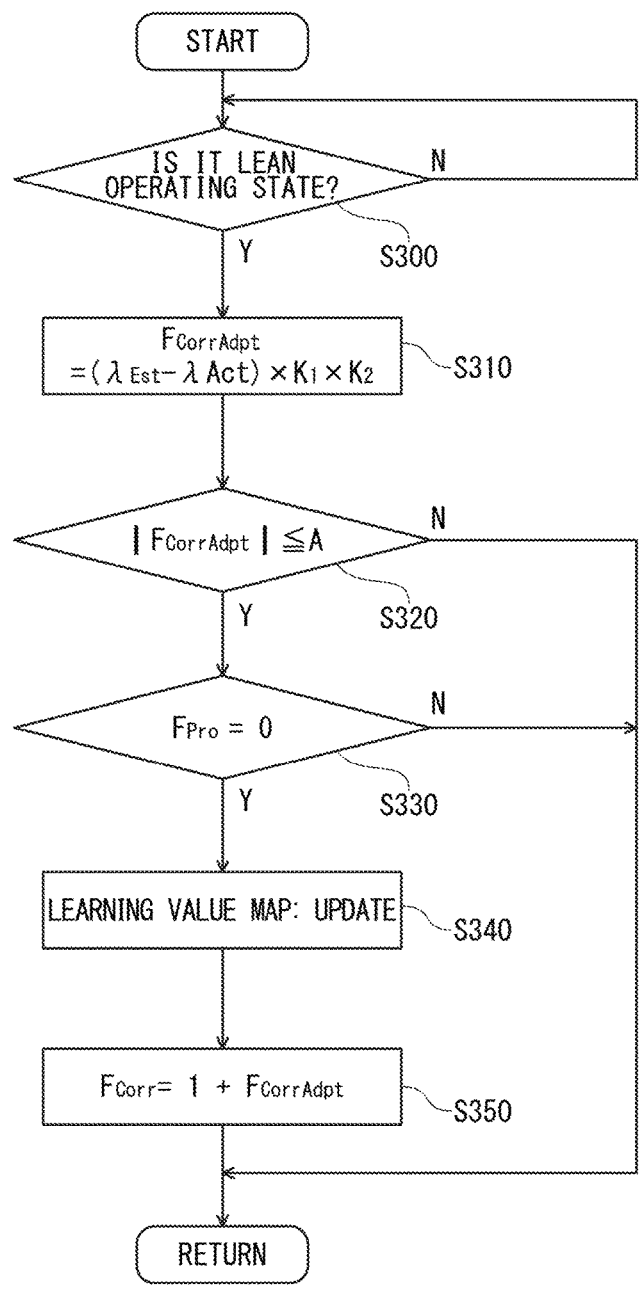
FIG. 12 is a flow diagram for describing a calculation process of a learning correction coefficient according to this embodiment.

The learning correction coefficient calculating unit 91 calculates a learning correction coefficient $F_{Corr}$ of the fuel injection amount on the basis of an error $\Delta\lambda$ between an actual lambda value $\lambda_{Act}$ detected by the NOx/lambda sensor 45 at the time of a lean operation of the engine 10 and an estimated lambda value $\lambda_{Est}$. When the exhaust gas is in the lean state, the HC concentration in the exhaust gas is very low, so that the change in the exhaust lambda value due to the oxidation reaction of HC in the oxidation catalyst 31 is negligibly small. For this reason, it is considered that the actual lambda value $\lambda_{Act}$ in the exhaust gas which passes through the oxidation catalyst 31 and is detected by the NOx/lambda sensor 45 on the downstream side matches with the estimated lambda value $\lambda_{Est}$ in the exhaust gas discharged from the engine 10. For this reason, in a case where the error $\Delta\lambda$ occurs between the actual lambda value $\lambda_{Act}$ and the estimated lambda value $\lambda_{Est}$, the error can be assumed to result from a difference between an instructed injection amount and an actual injection amount in the in-cylinder injector 11. Hereinafter, the calculation process of the learning correction coefficient performed by the learning correction coefficient calculating unit 91 using the error $\Delta\lambda$ will be described on the basis of the flow of FIG. 12.

In Step S300, it is determined on the basis of the engine speed Ne and the accelerator opening Q whether the engine 10 is in a lean operating state. If the engine 10 is in the lean operating state, the procedure proceeds to Step S310 in order to start the calculation of the learning correction coefficient.

In Step S310, a learning value $F_{CorrAdpt}$ is calculated by multiplying the error $\Delta\lambda$ obtained by subtracting the actual lambda value $\lambda_{Act}$ detected by the NOx/lambda sensor 45 from the estimated lambda value $\lambda_{Est}$ by a learning value gain $K_1$ and a correction sensitivity coefficient $K_2$ ($F_{CorrAdpt}=(\lambda_{Est}-\lambda_{Act})\times K_1\times K_2$). The estimated lambda value $\lambda_{Est}$ is estimated and calculated from the operating state of the engine 10 depending on the engine speed Ne or the accelerator opening Q. The correction sensitivity coefficient $K_2$ is read from a correction sensitivity coefficient map 91A illustrated in FIG. 11 using the actual lambda value $\lambda_{Act}$ detected by the NOx/lambda sensor 45 as an input signal.

In Step S320, it is determined whether an absolute value $|F_{CorrAdpt}|$ of the learning value $F_{CorrAdpt}$ is in a range of a predetermined correction limit value A. In a case where the absolute value $|F_{CorrAdpt}|$ exceeds the correction limit value A, this control returns to stop the present learning In Step S330, it is determined whether a learning prohibition flag $F_{Pro}$ is turned off. The learning prohibition flag $F_{Pro}$ corresponds, for example, to the time of a transient operation of the engine 10, the time of the SOx purge control ($F_{SP}=1$), the time of the NOx purge control ($F_{NP}=1$), and the like. It is because in a state where such a condition is satisfied, the error $\Delta\lambda$ becomes larger according to the change of the actual lambda value $\lambda_{Act}$ so that the learning is not executed exactly. As for whether the engine 10 is in a transient operating state, for example, on the basis of the time change amount of the actual lambda value $\lambda_{Act}$ detected by the NOx/lambda sensor 45, a case where the time change amount is larger than the predetermined threshold may be determined as the transient operating state.

In Step S340, a learning value map 91B (see FIG. 12) based on the engine speed Ne and the accelerator opening Q is updated to the learning value $F_{CorrAdpt}$ calculated in Step S310. More specifically, a plurality of learning areas sectioned in response to the engine speed Ne and the accelerator opening Q are set on the learning value map 91B. Preferably, such learning areas are set such that the range thereof is narrower as the area is used more frequently, and the range thereof is wider as the area is used less frequently. Accordingly, in the frequently used area, a learning accuracy can be improved, and in the less-frequently used area, non-learning can be effectively prevented.

In Step S350, the learning correction coefficient $F_{Corr}$ is calculated by adding "1" to the learning value read from the learning value map 91B using the engine speed Ne and the accelerator opening Q as input signals ($F_{Corr}=1+F_{CorrAdpt}$). The learning correction coefficient $F_{Corr}$ is input to the injection amount correcting unit 92 illustrated in FIG. 11.

The injection amount correcting unit 92 executes the correction of the fuel injection amount by multiplying respective basic injection amounts of a pilot injection $Q_{Pilot}$, a pre-injection $Q_{Pre}$, a main injection $Q_{Main}$, an after injection $Q_{After}$, and a post injection $Q_{Post}$ by the learning correction coefficient $F_{Corr}$.

In this manner, a variation such as the aged deterioration, the property change, or the individual difference of the in-cylinder injectors 11 can be effectively excluded by correcting the fuel injection amount of the in-cylinder injector 11 with the learning value according to the error $\Delta\lambda$ between the estimated lambda value $\lambda_{Est}$ and the actual lambda value $\lambda_{Act}$.

[MAF Correction Coefficient]

The MAF correction coefficient calculating unit 95 calculates a MAF correction coefficient $Maf_{corr}$ used to set the MAF target value $\text{MAF}_{SPL\_Trgt}$ or the target injection amount $Q_{SPR\_Trgt}$ at the time of the SOx purge control and to set the MAF target value $\text{MAF}_{NPL\_Trgt}$ or the target injection amount $Q_{NPR\_Trgt}$ at the time of the NOx purge control.

In this embodiment, the fuel injection amount of the in-cylinder injector 11 is corrected on the basis of the error $\Delta\lambda$ between the actual lambda value $\lambda_{Act}$ detected by the NOx/lambda sensor 45 and the estimated lambda value $\lambda_{Est}$. However, since the lambda is a ratio of air and fuel, a factor of the error $\Delta\lambda$ is not necessarily limited to the effect of the difference between the instructed injection amount and the actual injection amount in the in-cylinder injector 11. That is, the error $\Delta\lambda$ of the lambda may be affected by an error of the MAF sensor 40 as well as that of the in-cylinder injector 11.

Figure 13:
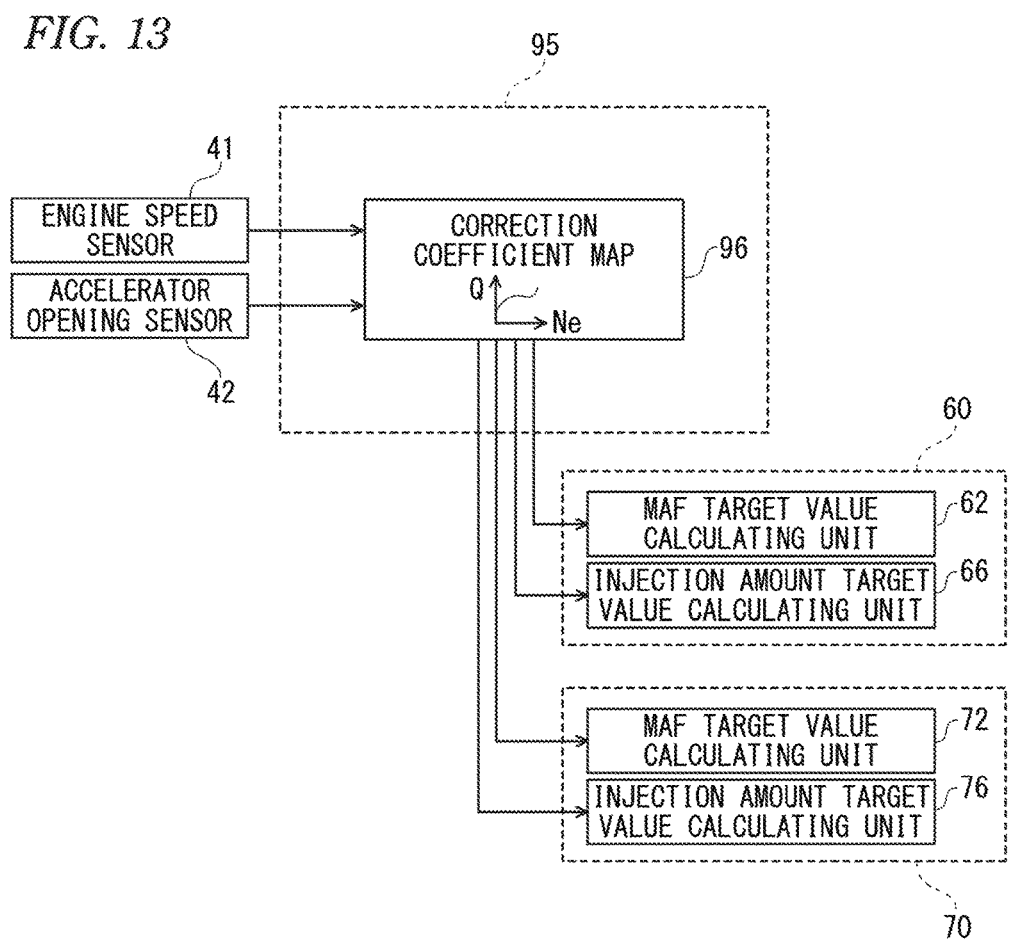
FIG. 13 is a block diagram illustrating a setting process of a MAF correction coefficient according to this embodiment.

FIG. 13 is a block diagram illustrating a setting process of the MAF correction coefficient $\text{Maf}_{\_corr}$ performed by the MAF correction coefficient calculating unit 95. A correction coefficient setting map 96 is a map based on the engine speed Ne and the accelerator opening Q, and the MAF correction coefficient $\text{Maf}_{\_corr}$ indicating the sensor property of the MAF sensor 40 corresponding to the engine speed Ne and the accelerator opening Q is set on the basis of an experiment and the like in advance.

The MAF correction coefficient calculating unit 95 reads the MAF correction coefficient $\text{Maf}_{\_corr}$ from the correction coefficient setting map 96 using the engine speed Ne and the accelerator opening Q as input signals, and transmits the MAF correction coefficient $\text{Maf}_{\_corr}$ to the MAF target value calculating unit 62 and the injection amount target value calculating unit 66. Accordingly, the sensor property of the MAF sensor 40 can be effectively reflected to set the MAF target value $\text{MAF}_{SPL\_Trgt}$ or the target injection amount $Q_{SPR\_Trgt}$ at the time of the SOx purge control.

[Others]

The present invention is not limited to the above-described embodiment, and the invention may be modified appropriately without departing from the spirit and scope of the invention.

This application is based upon and claims the benefit of priority from Japanese Patent Application No. 2015-062508, filed Mar. 25, 2015, the entire contents of which are incorporated herein by reference.

INDUSTRIAL APPLICABILITY

The exhaust purification system and the catalyst control method according to the present invention have an effect of quickly reducing the error between the actual catalyst temperature and the estimated temperature after starting the internal combustion engine, and are useful in that the exhaust gas discharged from the internal combustion engine is effectively purified.

REFERENCE SIGNS LIST

10: engine
11: in-cylinder injector
12: intake passage
13: exhaust passage
16: intake throttle valve
24: EGR valve
31: oxidation catalyst
32: NOx occlusion reduction type catalyst
33: filter
34: exhaust injector
40: MAF sensor
45: NOx/Lambda sensor
50: ECU

The invention claimed is:

1. An exhaust purification system comprising:
an NOx occlusion reduction type catalyst that is disposed in an exhaust passage of an internal combustion engine to occlude and reduce a nitrogen compound contained in an exhaust gas discharged from the internal combustion engine; and
a controller that controls an air-fuel ratio of the exhaust gas discharged from the internal combustion engine,
wherein the controller operates to execute a series of processes including:
estimating a temperature of the NOx occlusion reduction type catalyst based on an initial temperature of the NOx occlusion reduction type catalyst at the time of starting of the internal combustion engine and a caloric value of the NOx occlusion reduction type catalyst which changes depending on an operating state of the internal combustion engine;
storing the estimated temperature when the internal combustion engine transitions from the operating state to a stop state, as a pre-stop catalyst temperature;
storing a temperature of an exhaust gas flowing into the catalyst when the internal combustion engine transitions from the operating state to the stop state, as a first exhaust temperature;
acquiring a temperature of an exhaust gas flowing into the NOx occlusion reduction type catalyst at the time of starting the internal combustion engine, as a second exhaust temperature;
acquiring a temperature of air taken into the internal combustion engine at the time of starting the internal combustion engine, as an intake air temperature; and
setting an initial temperature of the NOx occlusion reduction type catalyst based on the pre-stop catalyst temperature, the first exhaust temperature, the second exhaust temperature, and the intake air temperature.

2. A catalyst control method in an exhaust purification system including an NOx occlusion reduction type catalyst that is disposed in an exhaust passage of an internal combustion engine to occlude and reduce a nitrogen compound contained in an exhaust gas discharged from the internal combustion engine, the method comprising:
estimating a temperature of the NOx occlusion reduction type catalyst based on an initial temperature of the NOx occlusion reduction type catalyst at the time of starting of the internal combustion engine and a caloric value of the NOx occlusion reduction type catalyst which changes depending on an operating state of the internal combustion engine;
storing the estimated temperature when the internal combustion engine transitions from the operating state to a stop state, as a pre-stop catalyst temperature;
storing a temperature of an exhaust gas flowing into the catalyst when the internal combustion engine transitions from the operating state to the stop state, as a first exhaust temperature;
acquiring a temperature of an exhaust gas flowing into the NOx occlusion reduction type catalyst at the time of starting the internal combustion engine, as a second exhaust temperature;
acquiring a temperature of air taken into the internal combustion engine at the time of starting the internal combustion engine, as an intake air temperature; and setting an initial temperature of the NOx occlusion reduction type catalyst based on the pre-stop catalyst temperature, the first exhaust temperature, the second exhaust temperature, and the intake air temperature.

* * * * *